United States Patent
Saito et al.

(10) Patent No.: US 7,295,408 B2
(45) Date of Patent: Nov. 13, 2007

(54) DUAL TYPE MAGNETIC SENSING ELEMENT WHEREIN ΔR×A IN UPSTREAM PART IN FLOW DIRECTION OF ELECTRIC CURRENT IS SMALLER THAN ΔR×A IN DOWNSTREAM PART

(75) Inventors: Masamichi Saito, Tokyo (JP); Naoya Hasegawa, Tokyo (JP); Yosuke Ide, Tokyo (JP); Masahiko Ishizone, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 357 days.

(21) Appl. No.: 11/155,289

(22) Filed: Jun. 17, 2005

(65) Prior Publication Data

US 2005/0280958 A1 Dec. 22, 2005

(30) Foreign Application Priority Data

Jun. 18, 2004 (JP) .............................. 2004-180380

(51) Int. Cl.
*G11B 5/39* (2006.01)

(52) U.S. Cl. .................................. 360/324.1

(58) Field of Classification Search ... 360/324.1–324.2
See application file for complete search history.

(56) References Cited

U.S. PATENT DOCUMENTS

| | | |
|---|---|---|
| 6,600,638 B2 | 7/2003 | Gill |
| 7,092,219 B2 * | 8/2006 | Pinarbasi ................ 360/324.1 |
| 7,180,714 B2 * | 2/2007 | Gill ........................ 360/324.1 |
| 2003/0035255 A1 | 2/2003 | Hasegawa et al. |
| 2003/0137785 A1 | 7/2003 | Saito |
| 2003/0179513 A1 | 9/2003 | Pinarbasi |
| 2003/0179514 A1 | 9/2003 | Pinarbasi |
| 2004/0008454 A1 | 1/2004 | Gill |
| 2005/0041342 A1 | 2/2005 | Huai et al. |

* cited by examiner

*Primary Examiner*—A. J. Heinz
(74) *Attorney, Agent, or Firm*—Brinks Hofer Gilson & Lione

(57) ABSTRACT

In a magnetic sensing element, the amounts of spin-dependent bulk scattering in the upstream part of a multilayer film and in the downstream part of the multilayer film are controlled to be asymmetric. Thus, a value ΔR×A, which represents the variation in magnetoresistance×element area, for the upstream part of the multilayer film is controlled so as to be smaller than the value ΔR×A for the downstream part of the multilayer film.

33 Claims, 7 Drawing Sheets

DUAL TYPE MAGNETIC SENSING ELEMENT WHEREIN ΔR×A IN UPSTREAM PART IN FLOW DIRECTION OF ELECTRIC CURRENT IS SMALLER THAN ΔR×A IN DOWNSTREAM PART

This application claims the benefit of priority to Japanese Patent Application 2004-180380, which was filed on Jun. 18, 2004, and which is incorporated herein by reference.

TECHNICAL FIELD

The present application relates to a current-perpendicular-to-the-plane (CPP) magnetic sensing element wherein a sense current flows in a direction perpendicular to a surface of a film, and in particular, to a magnetic sensing element that can decrease reproduction noise.

BACKGROUND

FIG. 7 shows a cross-sectional view of a known magnetic sensing element, which has a dual spin-valve structure.

This spin-valve magnetic sensing element includes a multilayer film 9, an electrode layer 1 disposed below the multilayer film 9, an electrode layer 10 disposed above the multilayer film 9, hard bias layers 11 disposed on both sides of a free magnetic layer 5, insulating layers 12 disposed below the hard bias layers 11, and insulating layers 13 disposed above the hard bias layers 11. The multilayer film 9 includes, from the bottom, an antiferromagnetic layer 2, a pinned magnetic layer 3, a nonmagnetic conductive layer 4, the free magnetic layer 5, a nonmagnetic conductive layer 6, a pinned magnetic layer 7, and an antiferromagnetic layer 8, in that order.

The antiferromagnetic layers 2 and 8 are composed of PtMn. The pinned magnetic layers 3 and 7 and the free magnetic layer 5 are composed of CoFe. The nonmagnetic conductive layers 4 and 6 are composed of Cu. The hard bias layers 11 are composed of a hard magnetic material such as CoPt. The insulating layers 12 and 13 are composed of alumina. The electrode layers 1 and 10 are composed of a conductive material such as Cr.

In the magnetic sensing element shown in FIG. 7, the nonmagnetic conductive layer 4 and the pinned magnetic layer 3 are disposed below the free magnetic layer 5, and in addition, the nonmagnetic conductive layer 6 and the pinned magnetic layer 7 are disposed above the free magnetic layer 5. The dual spin-valve magnetic sensing element shown in FIG. 7 detects the recording magnetic field from a recording medium such as a hard disk.

The magnetic sensing element shown in FIG. 7 is a current-perpendicular-to-the-plane (CPP) magnetic sensing element wherein a current flows in a direction perpendicular to the surfaces of the layers of the multilayer film 9.

The magnetization directions of the pinned magnetic layers 3 and 7 are pinned in the Y direction in the figure. The magnetization of the free magnetic layer 5 forms a single magnetic domain in the track width direction (the X direction in the figure) by a longitudinal bias magnetic field from the hard bias layers 11. The magnetization of the free magnetic layer 5 rotates in response to an external magnetic field. As a result, the electrical resistance of the multilayer film 9 changes. This change in the electrical resistance is converted to a change in voltage or current, and the external magnetic field is thereby detected.

For example, Japanese Unexamined Patent Application Publication No. 2002-157711 discloses such a CPP dual spin-valve element.

According to the known CPP dual spin-valve element, each pair of the antiferromagnetic layer 2 and the antiferromagnetic layer 8, the pinned magnetic layer 3 and the pinned magnetic layer 7, and the nonmagnetic conductive layer 4 and the nonmagnetic conductive layer 6 are composed of the same material and have the same thickness. In other words, the multilayer film 9 has a symmetric structure above and below the free magnetic layer 5.

Recently it has been discovered that noise due to a spin transfer torque (STT) may be generated in the reproduction output of CPP magnetoresistive elements.

When a current flows in a direction perpendicular to the surfaces of layers of a multilayer film, including a free magnetic layer, a nonmagnetic conductive layer, and a pinned magnetic layer, a spin angular momentum of conduction electrons is transmitted to a spin angular momentum of magnetic materials forming the free magnetic layer and the pinned magnetic layer. As a result a spin transfer torque that causes the spin angular momentum of the free magnetic layer to be unstable is generated. When the spin angular momentum of the free magnetic layer becomes unstable, noise overlaps the reproduction output causing a decrease in the signal-to-noise ratio of the magnetic sensing element.

When conduction electrons flow in the direction from the free magnetic layer to the pinned magnetic layer, a torque is applied so that the magnetization direction of the free magnetic layer is antiparallel with respect to the magnetization direction of the pinned magnetic layer. On the other hand, when conduction electrons flow in the direction from the pinned magnetic layer to the free magnetic layer, a torque is applied so that the magnetization direction of the free magnetic layer is parallel with respect to the magnetization direction of the pinned magnetic layer.

Accordingly, when conduction electrons flow from the upper side to the lower side of the dual spin-valve magnetic sensing element shown in FIG. 7, a spin transfer torque applied to the free magnetic layer 5 by conduction electrons flowing from the pinned magnetic layer 7 to the free magnetic layer 5 and a spin transfer torque applied to the free magnetic layer 5 by conduction electrons flowing from the free magnetic layer 5 to the pinned magnetic layer 3 are canceled out with respect to each other. As a result, the noise is reduced.

However, in the known CPP dual spin-valve magnetic sensing element, which includes the multilayer film 9 having a symmetric structure above and below the free magnetic layer 5, the noise due to the spin transfer torque cannot be satisfactorily reduced.

SUMMARY

A CPP magnetic sensing element that can significantly decrease noise due to a spin transfer torque compared with a known magnetic sensing element is described.

The CPP magnetic sensing element includes a multilayer film having a free magnetic layer, a nonmagnetic conductive layer provided under the free magnetic layer, a pinned magnetic layer provided under the free magnetic layer, a nonmagnetic conductive layer provided above the free magnetic layer, and a pinned magnetic layer provided above the free magnetic layer, wherein a current flows in a direction perpendicular to the surfaces of the layers of the multilayer film. In the magnetic sensing element, the free magnetic layer may include an upper free magnetic sublayer and a lower free magnetic sublayer. Optionally, an interlayer composed of a magnetic material or a nonmagnetic material may be disposed between the upper free magnetic sublayer and the lower free magnetic sublayer. In the magnetic sensing element, the lower free magnetic sublayer, the nonmagnetic conductive layer disposed below the lower free magnetic sublayer, and the pinned magnetic layer disposed below the lower free magnetic sublayer form a lower multilayer film, and the upper free magnetic sublayer, the nonmagnetic conductive layer disposed above the upper free magnetic sublayer, and the pinned magnetic layer disposed above the upper free magnetic sublayer form an upper multilayer film; and between the lower multilayer film and the upper multilayer film, one multilayer film disposed in the upstream part of the current of conduction electrons is defined as an upstream part of the multilayer film, and the other multilayer film disposed in the downstream part of the current of conduction electrons is defined as a downstream part of the multilayer film. Furthermore, in the magnetic sensing element, a value $\Delta R \times A$, which represents the variation in magnetoresistance ($\Delta R$)×element area (A), in the upstream part of the multilayer film is smaller than the value $\Delta R \times A$ in the downstream part of the multilayer film.

The spin transfer torque that is generated when conduction electrons flow from the free magnetic layer to the pinned magnetic layer is smaller than the spin transfer torque that is generated when conduction electrons flow from the pinned magnetic layer to the free magnetic layer.

In the known dual spin-valve magnetic sensing element that includes a multilayer film having a symmetric structure above and below the free magnetic layer, the spin transfer torque cannot be satisfactorily canceled out. In the multilayer film of the magnetic sensing element according to the present invention, however, an upstream part of the. multilayer film and a downstream part of the multilayer film have an asymmetric structure. Thus, the value $\Delta R \times A$ for the upstream part of the multilayer film is controlled so as to be smaller than the value $\Delta R \times A$ for the downstream part of the multilayer film.

This structure can satisfactorily cancel out the spin transfer torque applied to the free magnetic layer of the dual spin-valve magnetic sensing element. In principle, the spin transfer torque applied to the free magnetic layer can be decreased to zero.

The conditions for increasing the spin transfer torque include the following:

1. An absolute value of polarizability P of a magnetic material forming a pinned magnetic layer is increased.

2. An absolute value of $\beta$ of a magnetic material forming a pinned magnetic layer is increased. Herein, $\beta$ represents a value that is specific to the magnetic material, the value satisfying the formula of $\rho\downarrow/\rho\uparrow=(1+\beta)/(1-\beta)$ $(-1 \leq \beta \leq 1)$. The symbol $\rho\downarrow$ represents the specific resistance to minority conduction electrons among the conduction electrons, and the symbol $\rho\uparrow$ represents the specific resistance to majority conduction electrons among the conduction electrons.

The magnetic moments of magnetic atoms forming a magnetic material depend on the orbital magnetic moments and the spin magnetic moments of electrons primarily disposed in the 3$d$ orbital or the 4$f$ orbital. The number of spin-up electrons may be different from the number of spin-down electrons disposed in the 3$d$ orbital or the 4$f$ orbital. Between these spin-up electrons and spin-down electrons, one spin state of electrons being large in number is referred to as a majority spin, and the other spin state of electrons being small in number is referred to as a minority spin.

The electric current flowing through the magnetic material includes spin-up conduction electrons and spin-down conduction electrons. Between the spin-up conduction electrons and the spin-down conduction electrons, the conduction electrons having the same spin state as that of the majority spin of the magnetic material are referred to as majority conduction electrons, and the conduction electrons having the same spin state as that of the minority spin of the magnetic material are referred to as minority conduction electrons.

3. A thickness of a pinned magnetic layer is increased.

4. An absolute value of polarizability P of a free magnetic layer is increased.

5. An absolute value of $\beta$ of a free magnetic layer is increased.

6. A thickness of a nonmagnetic conductive layer that is disposed between a free magnetic layer and a pinned magnetic layer is decreased.

7. An element area of the magnetic sensing element is decreased.

Accordingly, the following structures may provide the value $\Delta R \times A$ for the upstream part of the multilayer film that is smaller than the value $\Delta R \times A$ for the downstream part of the multilayer film.

A1. The absolute value of polarizability P of a magnetic material forming one pinned magnetic layer disposed in the upstream part of the multilayer film is smaller than the absolute value of polarizability P of a magnetic material forming the other pinned magnetic layer disposed in the downstream part of the multilayer film.

A2. When each of the pinned magnetic layers has a synthetic ferrimagnetic structure including a first pinned magnetic sublayer, a second pinned magnetic sublayer, and a nonmagnetic interlayer disposed therebetween, and each second pinned magnetic sublayer is in contact with the corresponding nonmagnetic conductive layer, the absolute value of polarizability P of one second pinned magnetic sublayer disposed in the upstream part of the multilayer film is smaller than the absolute value of polarizability P of the other second pinned magnetic sublayer disposed in the downstream part of the multilayer film.

B1. The absolute value of $\beta$ of a magnetic material forming one pinned magnetic layer disposed in the upstream part of the multilayer film is smaller than the absolute value of $\beta$ of a magnetic material forming the other pinned magnetic layer disposed in the downstream part of the multilayer film.

B2. When each of the pinned magnetic layers has a synthetic ferrimagnetic structure including a first pinned magnetic sublayer, a second pinned magnetic sublayer, and a nonmagnetic interlayer disposed therebetween, and each second pinned magnetic sublayer is in contact with the corresponding nonmagnetic conductive layer, the absolute value of $\beta$ of one second pinned magnetic sublayer disposed in the upstream part of the multilayer film is smaller than the absolute value of $\beta$ of the other second pinned magnetic sublayer disposed in the downstream part of the multilayer film.

C1. The thickness of one pinned magnetic layer disposed in the upstream part of the multilayer film is smaller than the thickness of the other pinned magnetic layer disposed in the downstream part of the multilayer film.

C2. When each of the pinned magnetic layers has a synthetic ferrimagnetic structure including a first pinned magnetic sublayer, a second pinned magnetic sublayer, and a nonmagnetic interlayer disposed therebetween, and each second pinned magnetic sublayer is in contact with the corresponding nonmagnetic conductive layer, the thickness of one second pinned magnetic sublayer disposed in the upstream part of the multilayer film is smaller than the thickness of the other second pinned magnetic sublayer disposed in the downstream part of the multilayer film.

D. The element area A in the upstream part of the multilayer film is larger than the element area A in the downstream part of the multilayer film.

E. The thickness of one nonmagnetic conductive layer disposed in the upstream part of the multilayer film is larger than the thickness of the other nonmagnetic conductive layer disposed in the downstream part of the multilayer film.

F. Between the upper free magnetic sublayer and the lower free magnetic sublayer, the absolute value of polarizability P of one free magnetic sublayer forming the upstream part of the multilayer film is smaller than the absolute value of polarizability P of the other free magnetic sublayer forming the downstream part of the multilayer film.

G. Between the upper free magnetic sublayer and the lower free magnetic sublayer, the absolute value of β of one free magnetic sublayer forming the upstream part of the multilayer film is smaller than the absolute value of β of the other free magnetic sublayer forming the downstream part of the multilayer film.

H. Between the upper free magnetic sublayer and the lower free magnetic sublayer, the thickness of one free magnetic sublayer forming the upstream part of the multilayer film is smaller than the thickness of the other free magnetic sublayer forming the downstream part of the multilayer film.

I. When the free magnetic layer has a synthetic ferrimagnetic structure including a first free magnetic sublayer, a second free magnetic sublayer, a third free magnetic sublayer, and nonmagnetic interlayers disposed therebetween, and each of the first free magnetic sublayer and the third free magnetic sublayer is in contact with the corresponding nonmagnetic conductive layer, the third free magnetic sublayer is the upper free magnetic sublayer and the first free magnetic sublayer is the lower free magnetic sublayer.

The upper free magnetic sublayer and the lower free magnetic sublayer of the free magnetic layer are preferably composed of different materials.

Alternatively, according to the present invention, the free magnetic layer may have a single layer structure composed of a single magnetic material. In such a case, the upper half of the free magnetic layer corresponds to the upper free magnetic sublayer and the lower half of the free magnetic layer corresponds to the lower free magnetic sublayer when the free magnetic layer is bisected in the thickness direction.

In the magnetic sensing element according to the present invention, the upstream part of the multilayer film and the downstream part of the multilayer film have an asymmetric structure. Thus, the value ΔR×A for the upstream part of the multilayer film may be controlled so as to be smaller than the value ΔR×A for the downstream part of the multilayer film.

Accordingly, the spin transfer torque applied to the free magnetic layer of the dual spin-valve magnetic sensing element may be satisfactory canceled out to improve the signal-to-noise ratio of the magnetic sensing element. The improvement of the signal-to-noise ratio may increase the sense current, thereby increasing the reproduction output of the magnetic sensing element. In principle, the spin transfer torque applied to the free magnetic layer may be decreased to zero.

DETAILED DESCRIPTION

Figure 1:
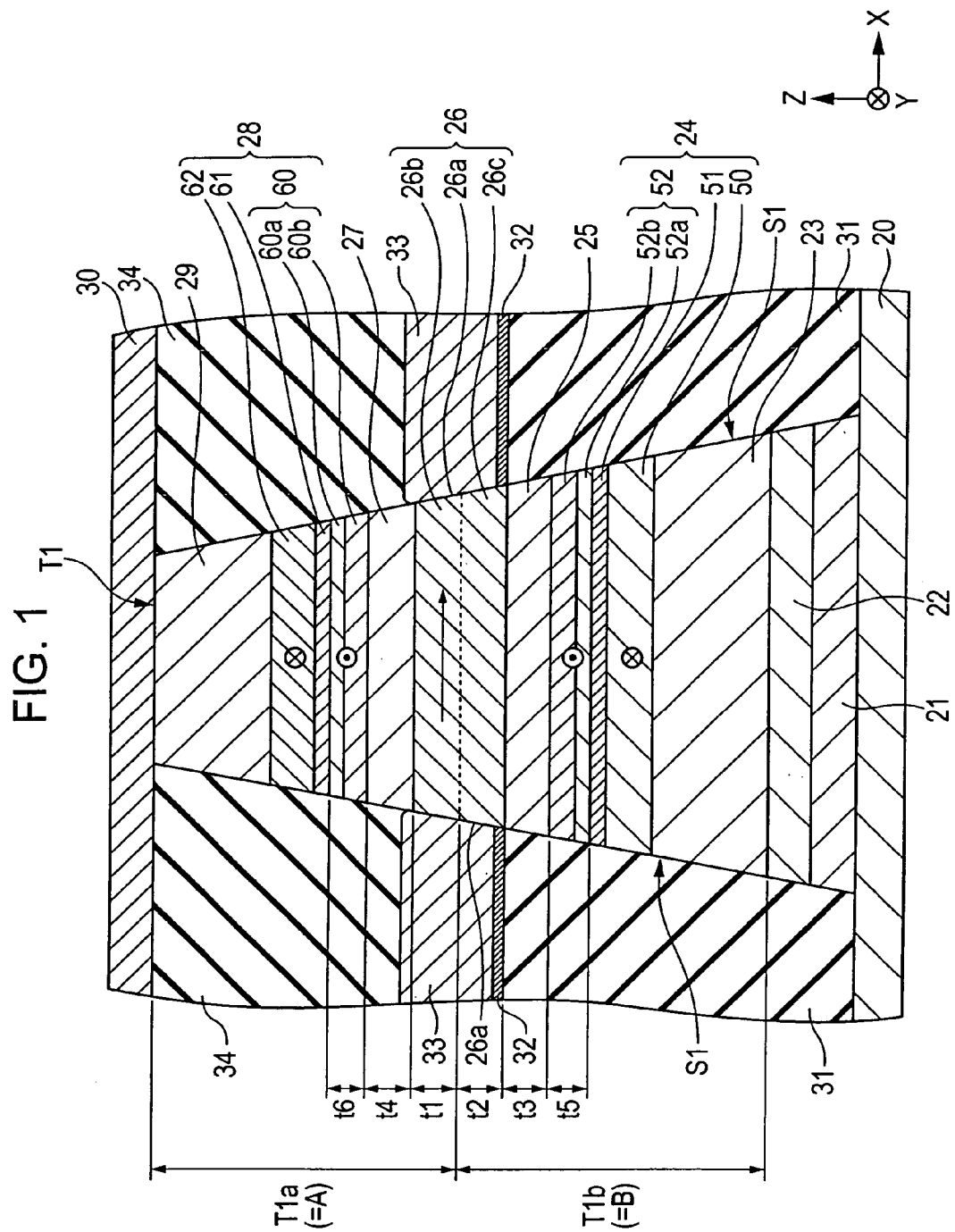
FIG. 1 is a partial cross-sectional view of the structure of a magnetic sensing element according to a first embodiment, viewed from a surface facing a recording medium.

FIG. 1 is a partial cross-sectional view of the structure of a magnetic sensing element according to a first embodiment, viewed from a surface facing a recording medium.

The magnetic sensing element shown in FIG. 1 is a dual type spin-valve thin film element.

Disposed on the center of a first electrode layer 20 are, from the bottom, a base layer 21, a seed layer 22, an antiferromagnetic layer 23, a pinned magnetic layer 24, a nonmagnetic conductive layer 25, and a free magnetic layer 26, in that order. The pinned magnetic layer 24 has a three-layer ferrimagnetic structure including a first pinned magnetic sublayer 50 and a second pinned magnetic sublayer 52 and a nonmagnetic interlayer 51 disposed therebetween. The nonmagnetic interlayer 51 may be composed of, for example, Ru. Furthermore, a nonmagnetic conductive layer 27, a pinned magnetic layer 28, an antiferromagnetic layer 29, and a second electrode layer 30 are laminated on the free magnetic layer 26, in that order. The pinned magnetic layer 28 also has a three-layer ferrimagnetic structure including a first pinned magnetic sublayer 62 and a second pinned magnetic sublayer 60, and a nonmagnetic interlayer 61 disposed therebetween. The nonmagnetic interlayer 61 may be composed of, for example, Ru.

The first electrode layer 20 may be composed of, for example, α-Ta, Au, Cr, Cu (copper), or W (tungsten). The base layer 21 may be composed of at least one element selected from Ta, Hf, Nb, Zr, Ti, Mo, and W. The base layer 21 has a thickness of about 50 Å or less. This base layer 21 may not be formed.

The seed layer 22 may have, primarily, a face-centered cubic (fcc) structure in which the (111) plane is preferentially oriented in a direction parallel to the interface with the antiferromagnetic layer 23, which will be described below. The seed layer 22 may be composed of Cr, a NiFe alloy, or a Ni—Fe—Y alloy, wherein Y is at least one element selected from Cr, Rh, Ta, Hf, Nb, Zr, and Ti. The seed layer 22 composed of the above material may be formed on the base layer 21 composed of, for example, Ta, whereby the (111) plane is preferentially oriented in the direction parallel to the interface with the antiferromagnetic layer 23 readily. The seed layer 22 may have a thickness of, for example, about 30 Å.

Since the magnetic sensing element of the present invention is a CPP magnetic sensing element wherein the sense current flows in a direction perpendicular to the surfaces of the layers, the sense current must flow in the seed layer 22 adequately. Therefore, the seed layer 22 used in such a CPP magnetic sensing element may be composed of a material, such as a NiFe alloy, having a low specific resistance. However, the seed layer 22 may not be formed.

The antiferromagnetic layer 23 and the antiferromagnetic layer 29 may be composed of an antiferromagnetic material containing X and Mn, wherein X is at least one element selected from Pt, Pd, Ir, Rh, Ru, and Os. Alternatively, the antiferromagnetic layer 23 and the antiferromagnetic layer 29 may be composed of an antiferromagnetic material containing X, X', and Mn, wherein X' is at least one element selected from Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare earth elements.

These antiferromagnetic materials have high corrosion resistance and blocking temperatures and can generate large exchange anisotropic magnetic fields at the interface with the pinned magnetic layer 24 or the pinned magnetic layer 28, which will be described below. The antiferromagnetic layer 23 and the antiferromagnetic layer 29 may have a thickness of 50 to 300 Å, for example, 200 Å.

In this embodiment, the pinned magnetic layer 24 and the pinned magnetic layer 28 may have a three-layer ferrimagnetic structure.

The pinned magnetic layer 24 includes a first pinned magnetic sublayer 50 and a second pinned magnetic sublayer 52. A nonmagnetic interlayer 51 composed of a nonmagnetic material is disposed between the first pinned magnetic sublayer 50 and the second pinned magnetic sublayer 52. In the same way, a nonmagnetic interlayer 61 composed of a nonmagnetic material is disposed between a first magnetic sublayer 62 and a second magnetic sublayer 60 of a pinned magnetic layer 28. The materials of the pinned magnetic layer 24 and the pinned magnetic layer 28 are described below.

An exchange anisotropic magnetic field is generated between the antiferromagnetic layer 23 and the first pinned magnetic sublayer 50 and between the antiferromagnetic layer 29 and the first pinned magnetic sublayer 62.

When the magnetization of the first pinned magnetic sublayer 50 is pinned in the height direction (in the Y direction in the figure), the second pinned magnetic sublayer 52 is magnetized and pinned in the direction opposite to the height direction by the Ruderman-Kittel-Kasuya-Yoshida (RKKY) interaction. When the magnetization of the first pinned magnetic sublayer 62 is pinned in the height direction, the second pinned magnetic sublayer 60 is magnetized and pinned in the direction opposite to the height direction by the RKKY interaction.

This structure can stabilize the magnetization of the pinned magnetic layer 24 and the pinned magnetic layer 28, and in addition, can strongly pin the magnetization direction of the pinned magnetic layer 24 and the pinned magnetic layer 28.

The first pinned magnetic sublayer 50, the second pinned magnetic sublayer 52, the first pinned magnetic sublayer 62, and the second pinned magnetic sublayer 60 may have a thickness of from about 10 to about 70 Å. The nonmagnetic interlayer 51 and the nonmagnetic interlayer 61 may have a thickness of from about 3 to about 10 Å.

Instead of the ferrimagnetic structure, the pinned magnetic layer 24 and the pinned magnetic layer 28 may be composed of a single layer film or a multilayer film including only magnetic sublayers.

Furthermore, the magnetization direction of the pinned magnetic layers 24 and 28 may be pinned by the coercive force of the pinned magnetic layers 24 and 28 themselves without forming the antiferromagnetic layers 23 and 29.

The nonmagnetic conductive layer 25 and the nonmagnetic conductive layer 27 may be composed of a conductive material having a low electrical resistance. The nonmagnetic conductive layer 25 and the nonmagnetic conductive layer 27 may have a thickness of, for example, about 25 Å. The materials of the nonmagnetic conductive layer 25 and the nonmagnetic conductive layer 27 are described below.

The free magnetic layer 26 may have a single layer structure composed of, for example, a NiFe alloy, a CoMnSi alloy, or a CoMnGe alloy. Alternatively, the free magnetic layer 26 may have a laminated structure composed of, for example, three layers including, for example, a CoFe alloy, a NiFe alloy, and a CoFe alloy layers.

The magnetization of the free magnetic layer 26 may be aligned in the X direction in the figure by a longitudinal bias magnetic field from hard bias layers 33 magnetized in the track width direction (the X direction in the figure).

Insulating layers 31 are disposed on the first electrode layer 20 at both sides of a multilayer film T1 in the track width direction. The insulating layers 31 may be composed of a standard insulating material, such as $Al_2O_3$ or $SiO_2$.

Bias base layers 32 are disposed on the insulating layers 31. The hard bias layers 33 are disposed on the bias base layers 32. The hard bias layers 33 are disposed at positions facing both end faces 26a of the free magnetic layer 26. The hard bias layers 33 are magnetized in the track width direction (the X direction in the figure).

The bias base layers 32 may be provided in order to improve the characteristics (the coercive force Hc and the remanence ratio S) of the hard bias layers 33.

The bias base layers 32 may be composed of a metal film having a body-centered cubic (bcc) structure. Herein, regarding the crystal orientation of the bias base layers 32, the (110) plane may be preferentially oriented.

The hard bias layers 33 may be composed of, for example, a CoPt alloy or a CoPtCr alloy. These alloys may have a crystal structure composed of a single hexagonal close-packed (hcp) structure or a mixed phase including a face-centered cubic (fcc) structure and the hexagonal close-packed (hcp) structure.

The bias base layers 32 may be disposed at only the lower part of the hard bias layers 33. However, a small amount of the bias base layers 32 may be disposed between both end faces 26a of the free magnetic layer 26 and the hard bias layers 33. The thickness in the track width direction (the X direction in the figure) of the bias base layers 32 formed between the end faces 26a of the free magnetic layer 26 and the hard bias layers 33 may be 1 nm or less.

According to this structure, the hard bias layers 33 and the free magnetic layer 26 can be magnetically continuous. As a result, a problem such as a buckling phenomenon in which the ends of the free magnetic layer 26 are affected by a demagnetizing field may not occur. Accordingly, the magnetic domain of the free magnetic layer 26 may be readily controlled.

The insulating layers 31 may be disposed between both end faces 26a of the free magnetic layer 26 and the bias base layers 32. In such a case, the shunt of the sense current to the hard bias layers 33 and the bias base layers 32 may be prevented.

As shown in FIG. 1, insulating layers 34 are disposed on the hard bias layers 33. The insulating layers 34 may be composed of a standard insulating material such as $Al_2O_3$ or $SiO_2$. In this embodiment, the top faces of the insulating layers 34 and the top face of the antiferromagnetic layer 29 form a continuous plane.

The second electrode layer 30 is disposed on the insulating layers 34 and the antiferromagnetic layer 29.

In this embodiment, the sense current may flow from the second electrode layer 30 to the first electrode layer 20 or from the first electrode layer 20 to the second electrode layer 30. In other words, the sense current flows in a direction perpendicular to the surfaces of layers through the layers of the magnetic sensing element. Such a flow direction of the sense current is called a CPP type.

When a detection current (i.e., sense current) is provided to the pinned magnetic layer 28, the nonmagnetic conductive layer 27, the free magnetic layer 26, the nonmagnetic conductive layer 25, and the pinned magnetic layer 24 and a leakage magnetic field from a recording medium such as a hard disk that drives in the Z direction is provided in the Y direction, the magnetization of the free magnetic layer 26 shifts from the X direction to the Y direction in the figure. The electrical resistance changes according to the relationship between the magnetization direction of the free magnetic layer 26 and the magnetization direction of the second pinned magnetic sublayer 52 of the pinned magnetic layer 24, and the relationship between the magnetization direction of the free magnetic layer 26 and the magnetization direction of the second pinned magnetic sublayer 60 of the pinned magnetic layer 28. (This phenomenon is referred to as a magnetoresistance effect.) The leakage magnetic field from the recording medium may be detected by changes in voltage or current based on the above change in the electrical resistance.

In the magnetic sensing element shown in FIG. 1, both end faces S1 of the multilayer film T1, which includes the base layer 21, the seed layer 22, the antiferromagnetic layer 23, the pinned magnetic layer 24, the nonmagnetic conductive layer 25, the free magnetic layer 26, the nonmagnetic conductive layer 27, the pinned magnetic layer 28, and the antiferromagnetic layer 29, form inclined continuous planes.

The features of the magnetic sensing element shown in FIG. 1 are described below.

In the present embodiment, the free magnetic layer 26 has a single layer structure formed with a single magnetic material. When the free magnetic layer 26 is bisected in the thickness direction, the upper half forms an upper free magnetic sublayer 26b and the lower half forms a lower free magnetic sublayer 26c.

The lower free magnetic sublayer 26c and the nonmagnetic conductive layer 25, the pinned magnetic layer 24, and the antiferromagnetic layer 23, which are disposed below the lower free magnetic sublayer 26c, form a lower multilayer film T1b. The upper free magnetic sublayer 26b and the nonmagnetic conductive layer 27, the pinned magnetic layer 28, and the antiferromagnetic layer 29, which are disposed above the upper free magnetic sublayer 26b, form an upper multilayer film T1a.

When the sense current flows from the lower side in the figure in the upward direction, conduction electrons flow from the upper side in the figure in the downward direction. Accordingly, the upper multilayer film T1a corresponds to an upstream part A of the multilayer film, the upstream part A being disposed upstream of the current of conduction electrons. The lower multilayer film T1b corresponds to a downstream part B of the multilayer film, the downstream part B being disposed downstream of the current of conduction electrons.

The second pinned magnetic sublayer 52 of the lower pinned magnetic layer 24 has a laminated structure including a first sublayer 52a and a second sublayer 52b. The first sublayer 52a may be composed of a CoFe alloy in order to increase an RKKY-like binding with the first pinned magnetic sublayer 50. The second sublayer 52b may be composed of a half-metal alloy having large absolute values of polarizability P and β.

The second pinned magnetic sublayer 60 of the upper pinned magnetic layer 28 has a laminated structure including a first sublayer 60a and a second sublayer 60b. The first sublayer 60a may be composed of a CoFe alloy in order to increase the RKKY-like binding with the first pinned magnetic sublayer 62. The second sublayer 60b may be composed of a half-metal alloy having large absolute values of polarizability P and β.

Polarizability P represents a ratio of the number (existence probability) of spin-up conduction electrons and the number (existence probability) of spin-down conduction electrons in a layer composed of a magnetic material.

Herein, β represents a value that is specific to the magnetic material, the value satisfying the formula of $\rho\downarrow/\rho\uparrow = (1+\beta)/(1-\beta)$ $(-\leq\beta\leq 1)$. The symbol $\rho\downarrow$ represents the specific resistance to minority conduction electrons among the conduction electrons, and the symbol $\rho\uparrow$ represents the specific resistance to majority conduction electrons among the conduction electrons.

The magnetic moments of magnetic atoms forming a magnetic material depend on the orbital magnetic moments and the spin magnetic moments of electrons primarily disposed in the 3d orbital or the 4f orbital. The number of spin-up electrons may be different from the number of spin-down electrons disposed in the 3d orbital or the 4f orbital. Between these spin-up electrons and spin-down electrons, one spin state of electrons being large in number is referred to as a majority spin, and the other spin state of electrons being small in number is referred to as a minority spin.

The electric current flowing through the magnetic material includes spin-up conduction electrons and spin-down conduction electrons. Between the spin-up conduction electrons and the spin-down conduction electrons, the conduction electrons having the same spin state as that of the majority spin of the magnetic material are referred to as majority conduction electrons, and the conduction electrons having the same spin state as that of the minority spin of the magnetic material are referred to as minority conduction electrons.

The term "half-metal" refers to a magnetic material that behaves as a metal to conduction electrons having one spin state, and behaves as an insulating material to conduction electrons having the other spin state.

Examples of half-metal alloys include Heusler alloys. Specific examples of such Heusler alloys are described below.

1. A metallic compound having a Heusler crystal structure represented by a composition formula $X_2YZ$ or XYZ, wherein X may be at least one element selected from Cu, Co, Ni, Rh, Pt, Au, Pd, Ir, Ru, Ag, Zn, Cd, and Fe; Y may be at least one element selected from Mn, Fe, Ti, V, Zr, Nb, Hf, Ta, Cr, Co, and Ni; and Z may be at least one element selected from Al, Sn, In, Sb, Ga, Si, Ge, Pb, and Zn.

2. A metallic compound having a Heusler crystal structure represented by a composition formula $Co_2YZ$, wherein Y may be at least one element selected from Mn, Fe and Cr; and Z may be at least one element selected from Al, Ga, Si, and Ge.

3. A metallic compound represented by a composition formula Co$_2$MnZ, wherein Z may be Si or Ge.

In the magnetic sensing element shown in FIG. 1, the absolute value of polarizability P of the second pinned magnetic sublayer 60 in the upstream part A of the multilayer film is smaller than that of the absolute value of polarizability P of the second pinned magnetic sublayer 52 in the downstream part B of the multilayer film. For this purpose, the second sublayer 60b of the second pinned magnetic sublayer 60 may be composed of, for example, a CoMnSi alloy and the second sublayer 52b of the second pinned magnetic sublayer 52 may be composed of, for example, a CoMnGe alloy.

In this case, the absolute value of β of the second pinned magnetic sublayer 60 in the upstream part A of the multilayer film is smaller than that of β of the second pinned magnetic sublayer 52 in the downstream part B of the multilayer film.

As described above, when the absolute value of polarizability P of the magnetic material forming the pinned magnetic layer is increased or the absolute value of β of the magnetic material forming the pinned magnetic layer is increased, the amount of spin-dependent bulk scattering of the pinned magnetic layer is increased.

Accordingly, in the present embodiment, the amount of spin-dependent bulk scattering is asymmetric in the upstream part A of the multilayer film T1 and in the downstream part B of the multilayer film T1 of the magnetic sensing element. In such a case, a value ΔR×A in the upstream part A of the multilayer film is smaller than the value ΔR×A in the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current, thereby increasing the reproduction output of the magnetic sensing element. In principle, the spin transfer torque applied to the free magnetic layer can be decreased to zero. In the present embodiment, both the second pinned magnetic sublayer 52 and the second pinned magnetic sublayer 60 have a laminated structure including a second sublayer composed of, for example, a Heusler alloy and a first sublayer composed of, for example, a CoFe alloy. Alternatively, the second pinned magnetic sublayer 52 in the downstream part B of the multilayer film may include only the second sublayer 52b composed of, for example, a Heusler alloy, and the second pinned magnetic sublayer 60 in the upstream part A of the multilayer film may include only the first sublayer 60a composed of, for example, a CoFe alloy.

When the sense current flows from the upper side in the figure in the downward direction, the conduction electrons flow from the lower side in the figure in the upward direction. Accordingly, the lower multilayer film T1b corresponds to the upstream part A of the multilayer film, the upstream part A being disposed upstream of the current of conduction electrons. The upper multilayer film T1a corresponds to the downstream part B of the multilayer film, the downstream part B being disposed downstream of the current of conduction electrons.

In such a case, the absolute value of polarizability P of the second pinned magnetic sublayer 52 is controlled so as to be smaller than that of the absolute value of polarizability P of the second pinned magnetic sublayer 60. For this purpose, the second sublayer 52b of the second pinned magnetic sublayer 52 may be composed of, for example, a CoMnSi alloy and the second sublayer 60b of the second pinned magnetic sublayer 60 may be composed of, for example, a CoMnGe alloy. In such a case, the absolute values of the polarizability P and β of the second pinned magnetic sublayer 52 are smaller than those of the second pinned magnetic sublayer 60.

Figure 2:
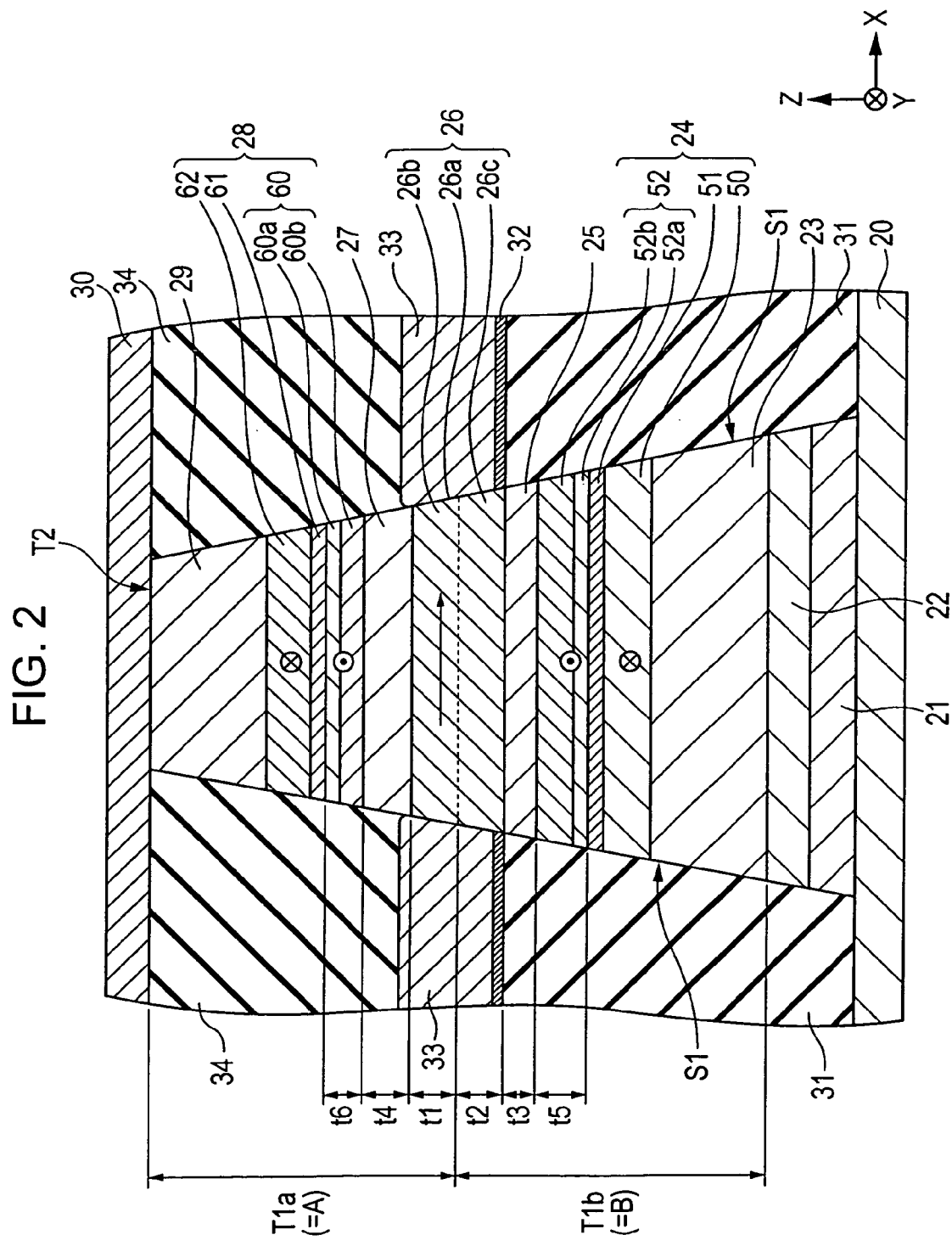
FIG. 2 is a partial cross-sectional view of the structure of a magnetic sensing element according to a second embodiment, viewed from a surface facing a recording medium.

FIG. 2 is a partial cross-sectional view of the structure of a magnetic sensing element according to a second embodiment, viewed from a surface facing a recording medium.

In the magnetic sensing element of the present embodiment, the pinned magnetic layer 24 and the pinned magnetic layer 28 are composed of the same material and the thickness t6 of the second pinned magnetic sublayer 60 of the pinned magnetic layer 28 is smaller than the thickness t5 of the second pinned magnetic sublayer 52 of the pinned magnetic layer 24. Other structures are the same as those of the magnetic sensing element shown in FIG. 1.

The second pinned magnetic sublayer 60 of the upper pinned magnetic layer 28 has a laminated structure including a first sublayer 60a and a second sublayer 60b. The first sublayer 60a may be composed of, for example, a CoFe alloy in order to increase the RKKY-like binding with the first pinned magnetic sublayer 62. The second sublayer 60b may be composed of, for example, a half-metal alloy having large absolute values of the polarizability P and β. The second pinned magnetic sublayer 52 of the lower pinned magnetic layer 24 also has a laminated structure including a first sublayer 52a and a second sublayer 52b. The first sublayer 52a may be composed of, for example, a CoFe alloy in order to increase the RKKY-like binding with the first pinned magnetic sublayer 50. The second sublayer 52b may be composed of, for example, a half-metal alloy having large absolute values of the polarizability P and β.

The second sublayer 60b of the second pinned magnetic sublayer 60 and the second sublayer 52b of the second pinned magnetic sublayer 52 may be composed of the same half-metal alloy, for example, a CoMnGe alloy. Alternatively, these second sublayers 60b and 52b may be composed of a magnetic alloy such as a CoFe alloy or a NiFe alloy, which is not a half-metal alloy.

In the present embodiment, the first sublayer 60a of the second pinned magnetic sublayer 60 and the first sublayer 52a of the second pinned magnetic sublayer 52 may have a thickness of about 10 Å.

The thickness of the second sublayer 60b and that of the second sublayer 52b may be different. For example, the second sublayer 60b may have a thickness of about 20 Å and the second sublayer 52b may have a thickness of about 50 Å.

The thickness t3 of the nonmagnetic conductive layer 25 may be equal to the thickness t4 of the nonmagnetic conductive layer 27. The thickness t1 of the upper free magnetic sublayer 26b may be equal to the thickness t2 of the lower free magnetic sublayer 26c of the free magnetic layer 26.

When the sense current flows from the lower side in the figure in the upward direction, conduction electrons flow from the upper side in the figure in the downward direction. Accordingly, the upper multilayer film T1a corresponds to the upstream part A of the multilayer film, the upstream part A being disposed upstream of the current of conduction electrons. The lower multilayer film T1b corresponds to the downstream part B of the multilayer film, the downstream part B being disposed downstream of the current of conduction electrons.

As described above, an increase in the thickness of the pinned magnetic layer increases the amount of spin-dependent bulk scattering. Accordingly, in the present embodiment, the amount of spin-dependent bulk scattering is asymmetric in the upstream part A of the multilayer film T2 with respect to the downstream part B of the multilayer film T2 of the magnetic sensing element. In such a case, the value $\Delta R \times A$ in the upstream part A of the multilayer film is smaller than the value $\Delta R \times A$ in the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current, thereby increasing the reproduction output of the magnetic sensing element. In principle, the spin transfer torque applied to the free magnetic layer can be decreased to zero.

When the sense current flows from the upper side in the figure in the downward direction, the conduction electrons flow from the lower side in the figure in the upward direction. Accordingly, the lower multilayer film T1b corresponds to the upstream part A of the multilayer film, the upstream part A being disposed upstream of the current of conduction electrons. The upper multilayer film T1a corresponds to the downstream part B of the multilayer film, the downstream part B being disposed downstream of the current of conduction electrons.

In such a case, the second pinned magnetic sublayers 52 and 60 are formed such that the thickness t5 of the second pinned magnetic sublayer 52 is smaller than the thickness t6 of the second pinned magnetic sublayer 60.

Figure 3:
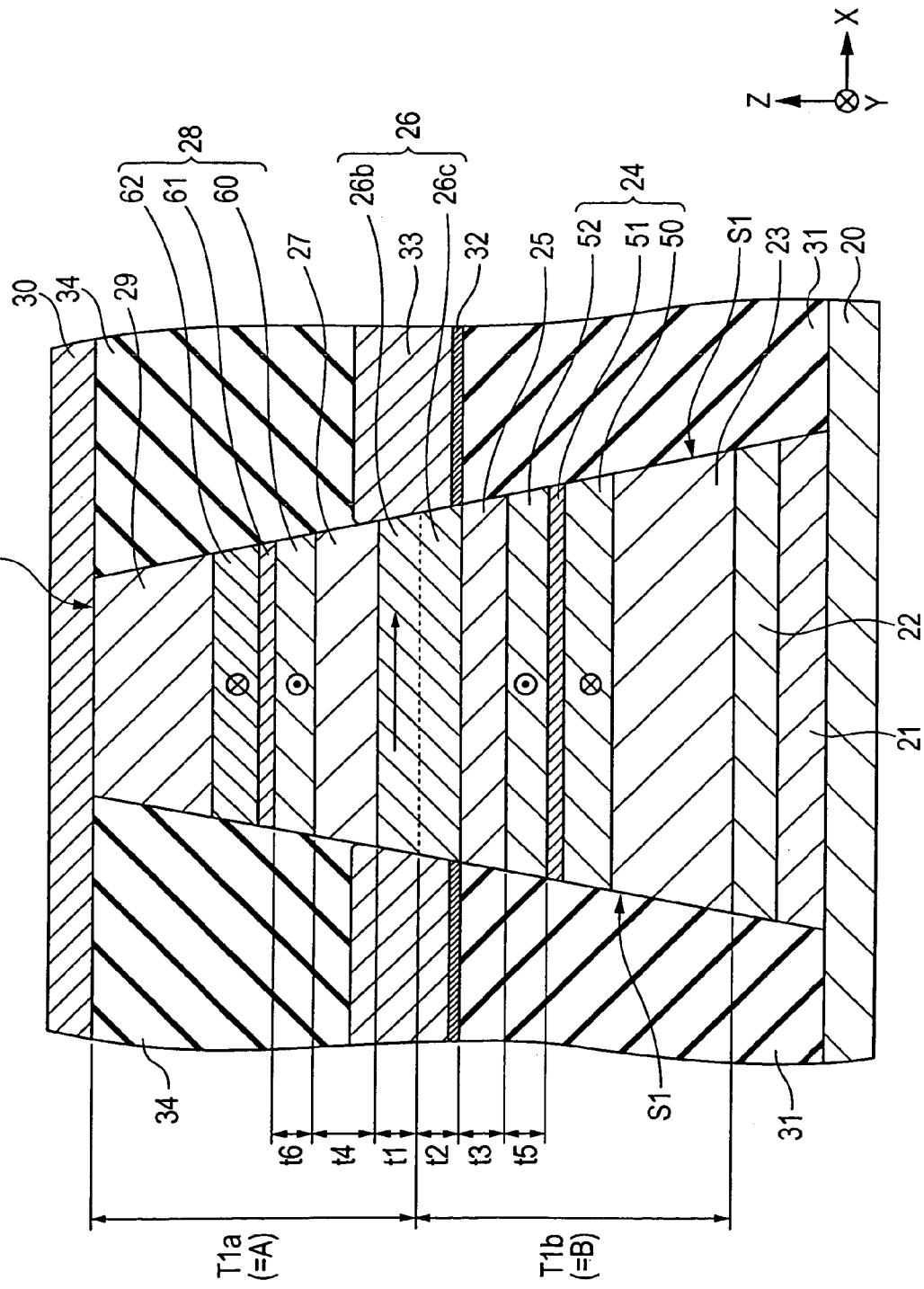
FIG. 3 is a partial cross-sectional view of the structure of a magnetic sensing element according to a third embodiment, viewed from a surface facing a recording medium.

FIG. 3 is a partial cross-sectional view of the structure of a magnetic sensing element according to a third embodiment, viewed from a surface facing a recording medium.

In the magnetic sensing element of the present embodiment, each of the second pinned magnetic sublayer 60 of the pinned magnetic layer 28 and the second pinned magnetic sublayer 52 of the pinned magnetic layer 24 may be composed of a single layer. In addition, the second pinned magnetic sublayer 60 and the second pinned magnetic sublayer 52 may be composed of the same material. The thickness t4 of the upper nonmagnetic conductive layer 27 may be larger than the thickness t3 of the lower nonmagnetic conductive layer 25. Other structures are the same as those of the magnetic sensing element shown in FIG. 1.

The second pinned magnetic sublayer 60 and the second pinned magnetic sublayer 52 may be composed of the same half-metal alloy, for example, a CoMnGe alloy. Alternatively, these second pinned magnetic sublayers 60 and 52 may be composed of a magnetic alloy such as a CoFe alloy or a NiFe alloy, which is not a half-metal alloy.

In the present embodiment, for example, the thickness t4 of the upper nonmagnetic conductive layer 27 may be about 90 Å and the thickness t3 of the lower nonmagnetic conductive layer 25 may be about 50 Å.

The thickness t5 of the second pinned magnetic sublayer 52 may be equal to the thickness t6 of the second pinned magnetic sublayer 60. The thickness t1 of the upper free magnetic sublayer 26b may be equal to the thickness t2 of the lower free magnetic sublayer 26c of the free magnetic layer 26.

When the sense current flows from the lower side in the figure in the upward direction, conduction electrons flow from the upper side in the figure in the downward direction. Accordingly, the upper multilayer film T1a corresponds to the upstream part A of the multilayer film, the upstream part A being disposed upstream of the current of conduction electrons. The lower multilayer film T1b corresponds to the downstream part B of the multilayer film, the downstream part B being disposed downstream of the current of conduction electrons.

In the present embodiment, the value $\Delta R \times A$ for the upstream part A of the multilayer film is smaller than the value $\Delta R \times A$ for the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current to increase the reproduction output of the magnetic sensing element. According to the present invention, in principle, the spin transfer torque applied to the free magnetic layer can be decreased to zero.

When the sense current flows from the upper side in the figure in the downward direction, the conduction electrons flow from the lower side in the figure in the upward direction. Accordingly, the lower multilayer film T1b corresponds to the upstream part A of the multilayer film, the upstream part A being disposed upstream of the current of conduction electrons. The upper multilayer film T1a corresponds to the downstream part B of the multilayer film, the downstream part B being disposed downstream of the current of conduction electrons.

In such a case, the nonmagnetic conductive layers 25 and 27 are formed such that the thickness t3 of the nonmagnetic conductive layer 25 is larger than the thickness t4 of the nonmagnetic conductive layer 27.

Figure 4:
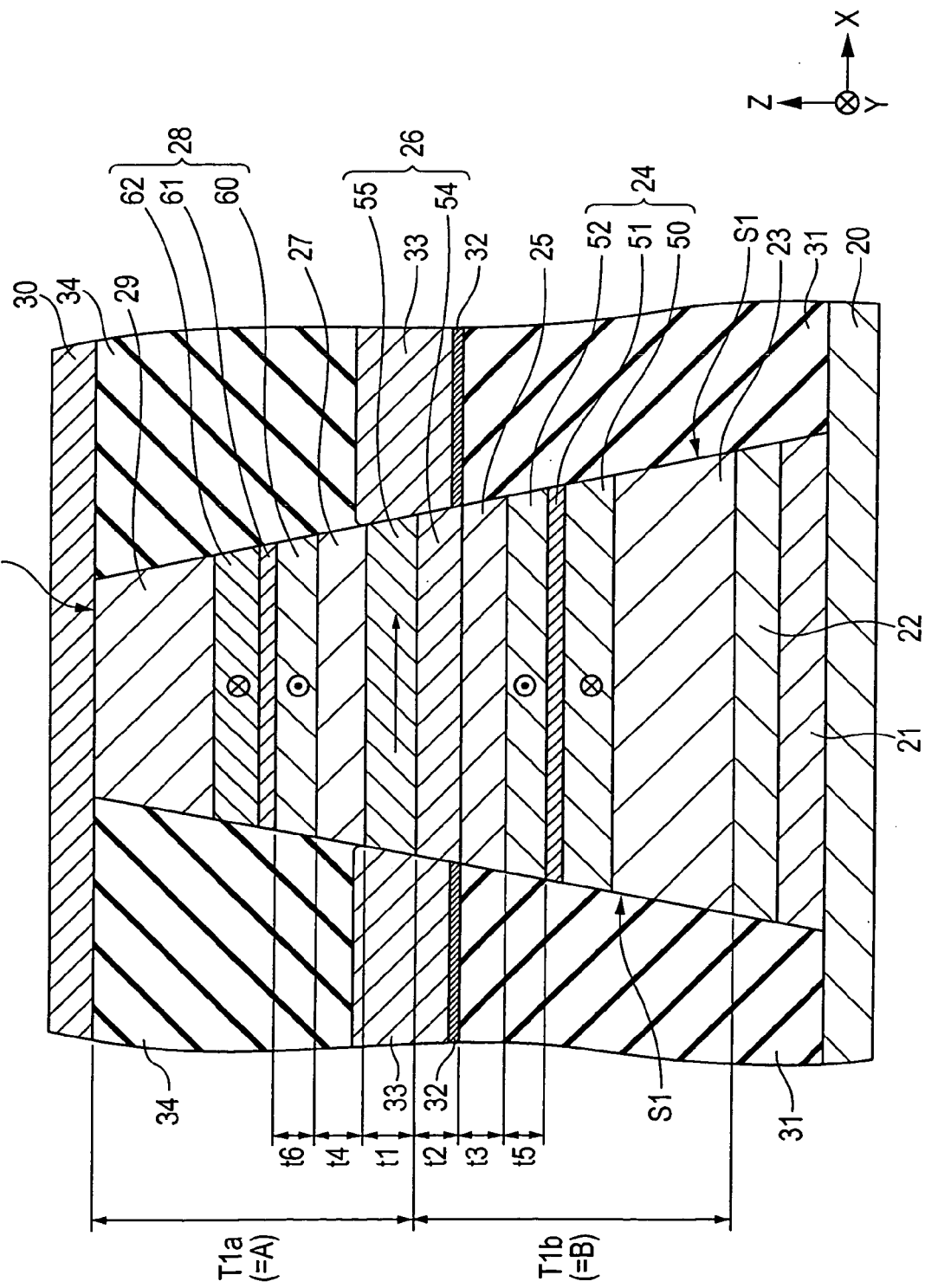
FIG. 4 is a partial cross-sectional view of the structure of a magnetic sensing element according to a fourth embodiment, viewed from a surface facing a recording medium.

FIG. 4 is a partial cross-sectional view of the structure of a magnetic sensing element according to a fourth embodiment, viewed from a surface facing a recording medium.

In the magnetic sensing element of the present embodiment, an upper free magnetic sublayer 55 and a lower free magnetic sublayer 54 of the free magnetic layer 26 may be composed of different magnetic materials. Each of the second pinned magnetic sublayer 60 of the pinned magnetic layer 28 and the second pinned magnetic sublayer 52 of the pinned magnetic layer 24 may be composed of a single layer. In addition, the second pinned magnetic sublayer 60 and the second pinned magnetic sublayer 52 may be composed of the same material. Other structures are the same as those of the magnetic sensing element shown in FIG. 1.

In FIG. 4, the absolute value of polarizability P of the upper free magnetic sublayer 55 forming the upstream part A of the multilayer film is smaller than the absolute value of polarizability P of the lower free magnetic sublayer 54 forming the downstream part B of the multilayer film. For this purpose, the upper free magnetic sublayer 55 may be composed, for example, of a CoMnSi alloy and the lower free magnetic sublayer 54 may be composed, for example, of a CoMnGe alloy.

In this case, the absolute value of β of the upper free magnetic sublayer 55 is smaller than the absolute value of β of the lower free magnetic sublayer 54.

As described above, when the absolute value of polarizability P of the free magnetic layer is increased or the absolute value of β of the free magnetic layer is increased, the amount of spin-dependent bulk scattering of the free magnetic layer is increased.

Accordingly, in the present embodiment, the amount of spin-dependent bulk scattering is asymmetric in the upstream part A of the multilayer film T2 and in the downstream part B of the multilayer film T2 of the magnetic sensing element. In such a case, the value $\Delta R \times A$ for the upstream part A of the multilayer film is smaller than the value ΔR×A for the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current, thereby increasing the reproduction output of the magnetic sensing element. In principle, the spin transfer torque applied to the free magnetic layer can be decreased to zero.

In the present embodiment, both the lower free magnetic sublayer 54 and the upper free magnetic sublayer 55 may be composed of, for example, a Heusler alloy. Alternatively, only the lower free magnetic sublayer 54 forming the downstream part B of the multilayer film may be composed of a Heusler alloy and the upper free magnetic sublayer 55 forming the upstream part A of the multilayer film may be composed of, for example, a CoFe alloy or a NiFe alloy.

When the sense current flows from the upper side in the figure in the downward direction, the conduction electrons flow from the lower side in the figure in the upward direction. Accordingly, the lower multilayer film T1b corresponds to the upstream part A of the multilayer film, the upstream part A being disposed upstream of the current of conduction electrons. The upper multilayer film T1a corresponds to the downstream part B of the multilayer film, the downstream part B being disposed downstream of the current of conduction electrons.

In such a case, the absolute value of polarizability P of the lower free magnetic sublayer 54 is controlled so as to be smaller than that of the absolute value of polarizability P of the upper free magnetic sublayer 55. For this purpose, the lower free magnetic sublayer 54 may be composed of, for example, a CoMnSi alloy and the upper free magnetic sublayer 55 may be composed of, for example, a CoMnGe alloy. In such a case, the absolute values of polarizability P and β of the lower free magnetic sublayer 54 are smaller than those of the upper free magnetic sublayer 55.

In the present embodiment, the thickness t5 of the second pinned magnetic sublayer 52 may be equal to the thickness t6 of the second pinned magnetic sublayer 60. The thickness t4 of the upper nonmagnetic conductive layer 27 may be equal to the thickness t3 of the lower nonmagnetic conductive layer 25.

The thickness t1 of the upper free magnetic sublayer 55 of the free magnetic layer 26 may be equal to the thickness t2 of the lower free magnetic sublayer 54. The thickness t1 of the upper free magnetic sublayer 55 forming the upstream part A of the multilayer film may be smaller than the thickness t2 of the lower free magnetic sublayer 54 forming the downstream part B of the multilayer film. In such a case, the difference between the ΔR×A for the upstream part A of the multilayer film and the value ΔR×A for the downstream part B of the multilayer film can be increased.

When the free magnetic layer 26 has a laminated structure including at least three sublayers composed of different magnetic materials, the top sublayer forms the upper free magnetic sublayer and the bottom sublayer forms the lower free magnetic sublayer.

Figure 5:
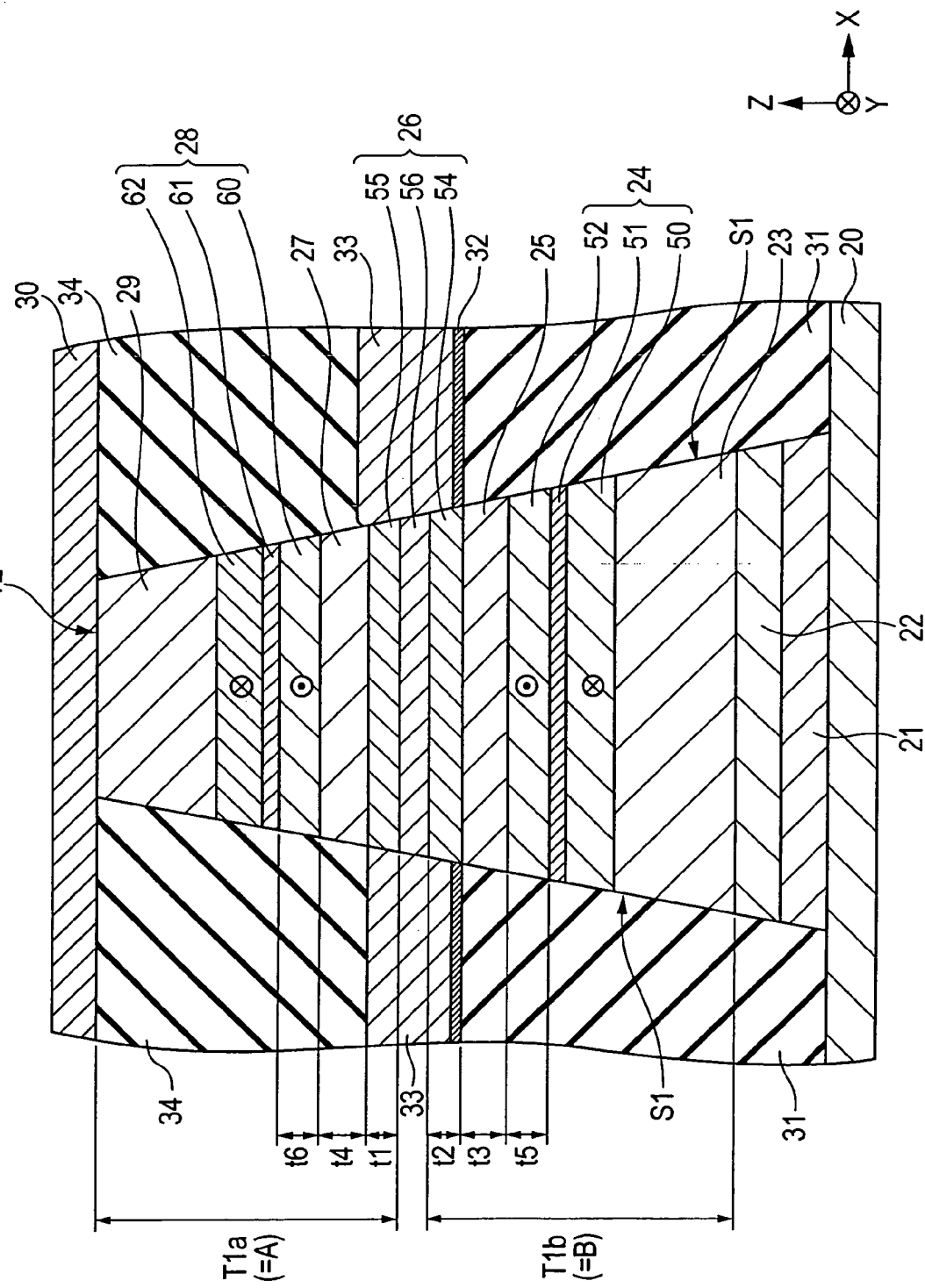
FIG. 5 is a partial cross-sectional view of the structure of a magnetic sensing element according to a fifth embodiment, viewed from a surface facing a recording medium.

For example, as shown in FIG. 5, in a free magnetic layer 26 including three sublayers, a lower free magnetic sublayer 54, a free magnetic interlayer 56, and an upper free magnetic sublayer 55 are laminated in that order from the bottom.

In the magnetic sensing element shown in FIG. 5, the absolute value of the polarizability P of the upper free magnetic sublayer 55 forming the upstream part A of the multilayer film is smaller than the absolute value of the polarizability P of the lower free magnetic sublayer 54 forming the downstream part B of the multilayer film. For this purpose, the upper free magnetic sublayer 55 may be composed of, for example, a CoMnSi alloy and the lower free magnetic sublayer 54 may be composed of, for example, a CoMnGe alloy. The free magnetic interlayer 56 is composed of a Heusler alloy, a CoFe alloy, or a NiFe alloy.

In this case, the absolute value of β of the upper free magnetic sublayer 55 is smaller than the absolute value of β of the lower free magnetic sublayer 54.

As described above, when the absolute value of the polarizability P of the free magnetic layer is increased or the absolute value of β of the free magnetic layer is increased, the amount of spin-dependent bulk scattering of the free magnetic layer is increased.

Accordingly, in the present embodiment, the amount of spin-dependent bulk scattering is asymmetric in the upstream part A of the multilayer film T2 and in the downstream part B of the multilayer film T2 of the magnetic sensing element. In such a case, the value ΔR×A for the upstream part A of the multilayer film is smaller than the value ΔR×A for the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current, thereby increasing the reproduction output of the magnetic sensing element. In principle, the spin transfer torque applied to the free magnetic layer can be decreased to zero.

The thickness t1 of the upper free magnetic sublayer 55 forming the upstream part A of the multilayer film may be smaller than the thickness t2 of the lower free magnetic sublayer 54 forming the downstream part B of the multilayer film. In such a case, the difference between the ΔR×A for the upstream part A of the multilayer film and the value ΔR×A for the downstream part B of the multilayer film can be increased.

Figure 6:
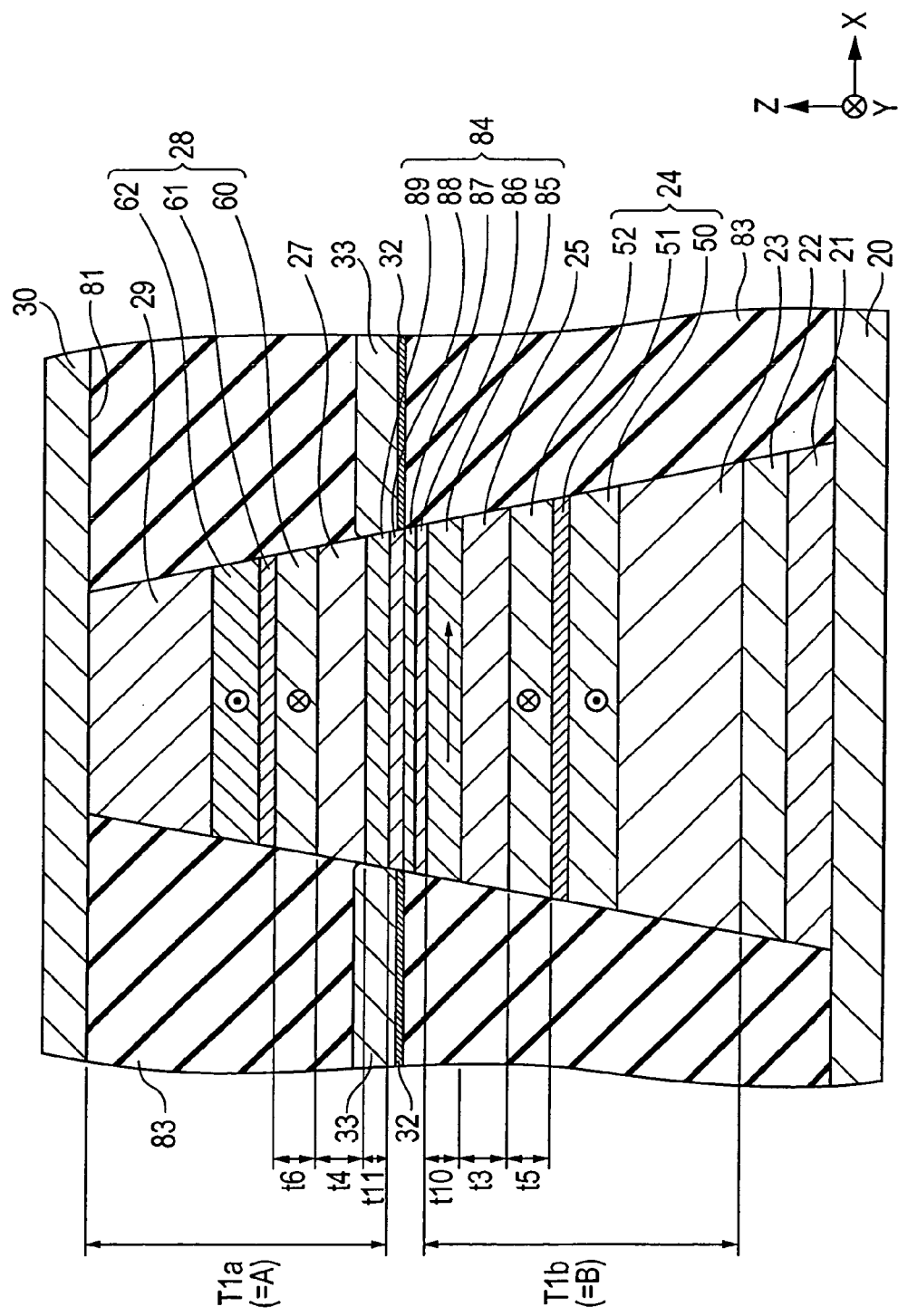
FIG. 6 is a partial cross-sectional view of the structure of a magnetic sensing element according to a sixth embodiment, viewed from a surface facing a recording medium.
Figure 7:
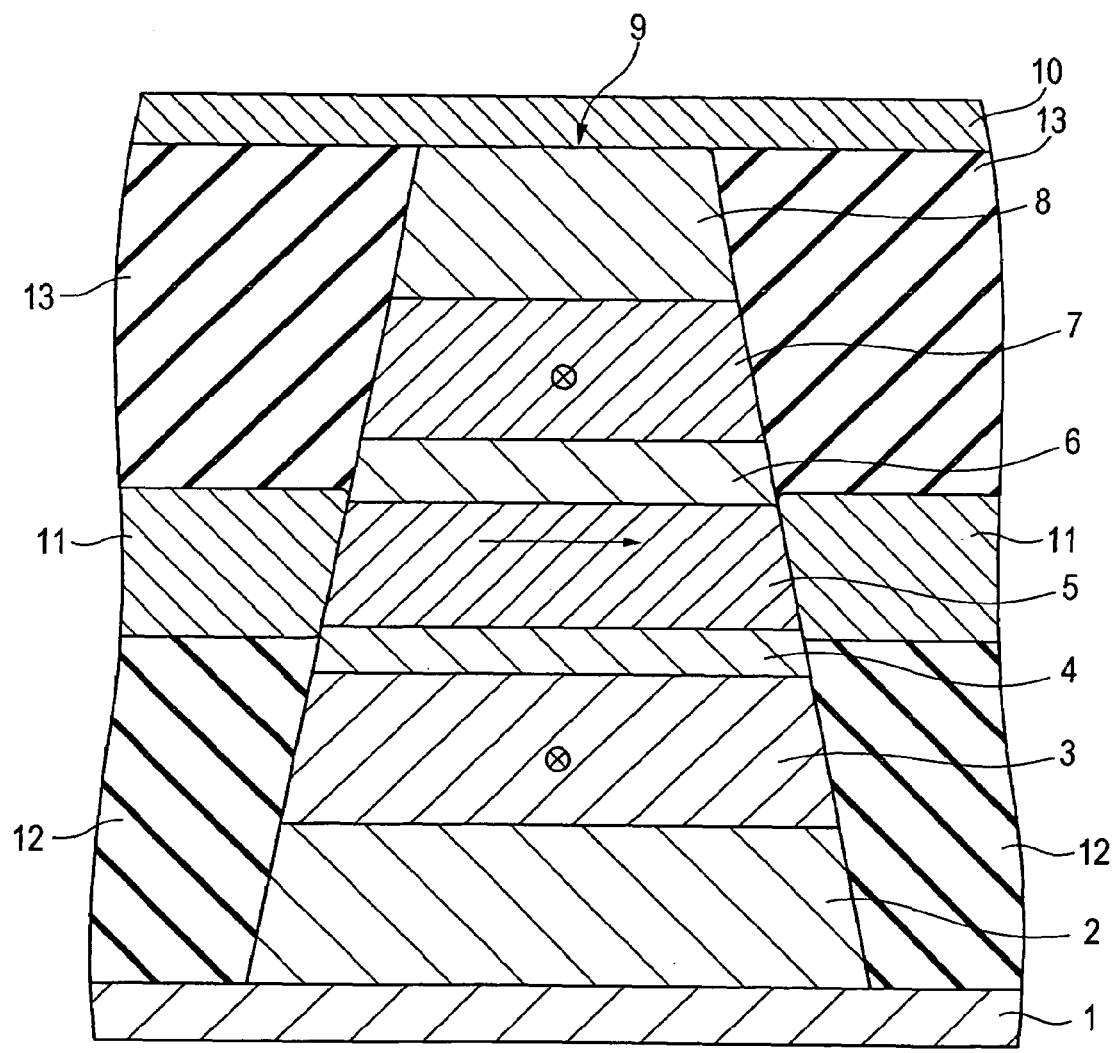
FIG. 7 is a partial cross-sectional view of the structure of a known magnetic sensing element, viewed from a surface facing a recording medium.

FIG. 6 is a partial cross-sectional view of the structure of a magnetic sensing element according to a sixth embodiment, viewed from a surface facing a recording medium.

The magnetic sensing element shown in FIG. 6 is different from the magnetic sensing element shown in FIG. 5 in that a free magnetic layer 84, including a first free magnetic sublayer 85, a nonmagnetic interlayer 86, a second free magnetic sublayer 87, a nonmagnetic interlayer 88, and a third free magnetic sublayer 89, has a synthetic ferrimagnetic structure. The magnetization directions of the first free magnetic sublayer 85 and the second free magnetic sublayer 87 are aligned in antiparallel directions with respect to each other by the RKKY interaction, with the nonmagnetic interlayer 86 therebetween. The magnetization directions of the second free magnetic sublayer 87 and the third free magnetic sublayer 89 are also aligned in antiparallel directions with respect to each other by the RKKY interaction, with the nonmagnetic interlayer 88 therebetween.

In the present embodiment, the third free magnetic sublayer 89 corresponds to the upper free magnetic sublayer and the first free magnetic sublayer 85 corresponds to the lower free magnetic sublayer.

In other words, the absolute value of polarizability P of the third free magnetic sublayer 89 forming the upstream part A of the multilayer film is smaller than the absolute value of polarizability P of the first free magnetic sublayer 85 forming the downstream part B of the multilayer film. For this purpose, the third free magnetic sublayer 89 may be composed of, for example, a CoMnSi alloy and the first free magnetic sublayer 85 may be composed of, for example, a CoMnGe alloy.

In this case, the absolute value of β of the third free magnetic sublayer 89 is smaller than the absolute value of β of the first free magnetic sublayer 85.

As described above, when the absolute value of polarizability P of the free magnetic layer is increased or the absolute value of β of the free magnetic layer is increased, the amount of spin-dependent bulk scattering of the free magnetic layer is increased.

Accordingly, in the present embodiment, the amount of spin-dependent bulk scattering is asymmetric in the upstream part A of the multilayer film and in the downstream part B of the multilayer film of the magnetic sensing element. In such a case, the value $\Delta R \times A$ for the upstream part A of the multilayer film is smaller than the value $\Delta R \times A$ for the downstream part B of the multilayer film.

According to the above structure, the spin transfer torque applied to the free magnetic layer of the dual spin-valve magnetic sensing element can be satisfactorily canceled out to improve the signal-to-noise ratio of the magnetic sensing element. The improvement of the signal-to-noise ratio can increase the sense current, thereby increasing the reproduction output of the magnetic sensing element. In principle, the spin transfer torque applied to the free magnetic layer can be decreased to zero.

In the present embodiment, both the first free magnetic sublayer 85 and the third free magnetic sublayer 89 may be composed of, for example, a Heusler alloy. Alternatively, only the first free magnetic sublayer 85 forming the downstream part B of the multilayer film may be composed of a Heusler alloy and the third free magnetic sublayer 89 forming the upstream part A of the multilayer film may be composed of, for example, a CoFe alloy or a NiFe alloy.

In the present embodiment, the thickness t5 of the second pinned magnetic sublayer 52 may be equal to the thickness t6 of the second pinned magnetic sublayer 60. The thickness t4 of the upper nonmagnetic conductive layer 27 may be equal to the thickness t3 of the lower nonmagnetic conductive layer 25.

The thickness t11 of the third free magnetic sublayer 89 of the free magnetic layer 84 may be equal to the thickness t10 of the first free magnetic sublayer 85. The thickness t11 of the third free magnetic sublayer 89 forming the upstream part A of the multilayer film may be smaller than the thickness t10 of the first free magnetic sublayer 85 forming the downstream part B of the multilayer film. In such a case, the difference between the $\Delta R \times A$ for the upstream part A of the multilayer film and the value $\Delta R \times A$ for the downstream part B of the multilayer film can be increased.

When the sense current flows from the upper side in the figure in the downward direction, the conduction electrons flow from the lower side in the figure in the upward direction. Accordingly, the lower multilayer film T1*b* corresponds to the upstream part A of the multilayer film, the upstream part A being disposed upstream of the current of conduction electrons. The upper multilayer film T1*a* corresponds to the downstream part B of the multilayer film, the downstream part B being disposed downstream of the current of conduction electrons.

In such a case, the absolute value of the polarizability P of the first free magnetic sublayer 85 is controlled so as to be smaller than that of the absolute value of polarizability P of the third free magnetic sublayer 89. For this purpose, the first free magnetic sublayer 85 may be composed of, for example, a CoMnSi alloy and the third free magnetic sublayer 89 may be composed of, for example, a CoMnGe alloy. In such a case, the absolute values of the polarizability P and β of the first free magnetic sublayer 85 are smaller than those of the polarizability P and β of the third free magnetic sublayer 89.

Furthermore, the element area in the upstream part of the multilayer film may be controlled so as to be larger than the element area in the downstream part of the multilayer film. In such a case, the amount of spin-dependent bulk scattering may be asymmetric in the upstream part of the multilayer film and in the downstream part of the multilayer film of the magnetic sensing element. For example, the side faces of the multilayer film of the magnetic sensing element shown in FIGS. 1 to 6 form inclined planes. Therefore, the element area in the lower multilayer film is larger than the element area in the upper multilayer film. In this case, the lower multilayer film T1*b* forms the upstream part of the multilayer film, and the upper multilayer film T1*a* forms the downstream part of the multilayer film. As a result, the value $\Delta R \times A$ for the upstream part of the multilayer film is smaller than the value $\Delta R \times A$ for the downstream part of the multilayer film. Thus, the spin transfer torque applied to the free magnetic layer of the dual spin-valve magnetic sensing element can be satisfactorily canceled out.

Any combination of the layered structures described herein in each independent embodiment may be provided in a single magnetic sensing element.

EXAMPLES

Example 1

Current-perpendicular-to-the-plane-giant magnetoresistive (CPP-GMR) magnetic sensing elements having the following layer structures were formed, where the numerical values in parentheses represent the thickness of each layer.

base layer Ta (30 Å)/seed layer NiFeCr (40 Å)/antiferromagnetic layer PtMn (120 Å)/first pinned magnetic sublayer CoFe (30 Å)/nonmagnetic interlayer Ru (8 Å)/second pinned magnetic sublayer/nonmagnetic conductive layer Cu (30 Å)/free magnetic layer (lower free magnetic sublayer/upper free magnetic sublayer)/nonmagnetic conductive layer Cu (30 Å)/second pinned magnetic sublayer/nonmagnetic interlayer Ru (8 Å)/first pinned magnetic sublayer CoFe (30 Å)/antiferromagnetic layer PtMn (120 Å)/protective layer Ta (30 Å)

The change in the value $\Delta R \times A$ was examined when the material of a second pinned magnetic sublayer disposed above a free magnetic layer and the material of another second pinned magnetic sublayer disposed below the free magnetic layer were different. Table 1 shows the results.

TABLE 1

| | Lower second pinned magnetic sublayer The left material is adjacent to Ru layer(Å) | Upper second pinned magnetic sublayer The left material is adjacent to Ru layer(Å) | Free magnetic layer The left material forms lower layer(Å) | ΔR × A of multilayer film (mΩμm²) | ΔR × A of lower multilayer film (mΩμm²) | ΔR × A of upper multilayer film (mΩμm²) |
|---|---|---|---|---|---|---|
| | | | In the case where upper and lower second pinned magnetic sublayers may be composed of different materials | | | |
| Comparative example 1 | CoFe(50) | CoFe(50) | CoFe(10)/NiFe(60)/CoFe(10) | 2.2 | 1.1 | 1.1 |
| Comparative example 2 | CoFe(50) | CoFe(50) | CoMnSi(80) | 4.1 | 2.05 | 2.05 |
| Comparative example 3 | CoFe(10)/CoMnSi(40) | CoFe(10)/CoMnSi(40) | CoMnSi(80) | 7.4 | 3.7 | 3.7 |
| Comparative example 4 | CoFe(10)/CoMnGe(40) | CoFe(10)/CoMnGe(40) | CoMnSi(80) | 8.8 | 4.4 | 4.4 |
| Example 1 | CoFe(10)/CoMnSi(40) | CoFe(50) | CoMnSi(80) | 5.3 | 3.25–3.7 | 1.6–2.05 |
| Example 2 | CoFe(50) | CoFe(10)/CoMnSi(40) | CoMnSi(80) | 5.4 | 1.7–2.05 | 3.35–3.7 |
| Example 3 | CoFe(10)/CoMnGe(40) | CoFe(10)/CoMnSi(40) | CoMnSi(80) | 8.2 | 4.4–4.5 | 3.7–3.8 |
| Example 4 | CoFe(10)/CoMnSi(40) | CoFe(10)/CoMnGe(40) | CoMnSi(80) | 8.1 | 3.7 | 4.4 |

In Comparative example 1, the lower CoFe sublayer of the free magnetic layer corresponded to the lower free magnetic sublayer and the upper CoFe sublayer corresponded to the upper free magnetic sublayer. In the magnetic sensing elements other than that in Comparative example 1, the free magnetic layer was composed of a single CoMnSi layer. The lower half of the CoMnSi layer formed the lower free magnetic sublayer of the present invention and the upper half of the CoMnSi layer formed the upper free magnetic sublayer of the present invention.

In the above layered structure, the antiferromagnetic layer composed of PtMn (120 Å), the first pinned magnetic sublayer composed of CoFe (30 Å), the nonmagnetic interlayer composed of Ru (8 Å), the second pinned magnetic sublayer, the nonmagnetic conductive layer composed of Cu (30 Å), and the lower free magnetic sublayer corresponded to the lower multilayer film. The upper free magnetic sublayer, the nonmagnetic conductive layer composed of Cu (30 Å), the second pinned magnetic sublayer, the nonmagnetic interlayer composed of Ru (8 Å), the first pinned magnetic sublayer composed of CoFe (30 Å), and the antiferromagnetic layer composed of PtMn (120 Å) corresponded to the upper multilayer film.

In Examples 1 and 3, the sense current flowed from the bottom to the top of the multilayer film, and therefore, the conduction electrons flowed from the top to the bottom. Accordingly, in Examples 1 and 3, the upper multilayer film corresponded to the upstream part of the multilayer film and the lower multilayer film corresponded to the downstream part of the multilayer film. On the other hand, in Examples 2 and 4, the sense current flowed from the top to the bottom of the multilayer film, and therefore, the conduction electrons flowed from the bottom to the top. Accordingly, in Examples 2 and 4, the lower multilayer film corresponded to the upstream part of the multilayer film and the upper multilayer film corresponded to the downstream part of the multilayer film.

In the Examples, the materials of the second pinned magnetic sublayer disposed above the free magnetic layer and the second pinned magnetic sublayer disposed below the free magnetic layer were selected as shown in Table 1. Accordingly, the absolute values of the polarizability P and β of the second pinned magnetic sublayer in the upstream part of the multilayer film were smaller than those of the polarizability P and β of the second pinned magnetic sublayer in the downstream part of the multilayer film.

As a result, the value ΔR×A for the upstream part A of the multilayer film was smaller than the value ΔR×A for the downstream part B of the multilayer film.

Example 2

CPP-GMR magnetic sensing elements having the following layer structures were formed, where the numerical values in parentheses represent the thickness of each layer.

base layer Ta (30 Å)/seed layer NiFeCr (40 Å)/antiferromagnetic layer PtMn (120 Å)/first pinned magnetic sublayer CoFe (30 Å)/nonmagnetic interlayer Ru (8 Å)/second pinned magnetic sublayer (CoFe/CoMnGe)/nonmagnetic conductive layer Cu (30 Å)/free magnetic layer CoMnSi (lower free magnetic sublayer/upper free magnetic sublayer)/nonmagnetic conductive layer Cu (30 Å)/second pinned magnetic sublayer (CoMnGe/CoFe)/nonmagnetic interlayer Ru (8 Å)/first pinned magnetic sublayer CoFe (30 Å)/antiferromagnetic layer PtMn (120 Å)/protective layer Ta (30 Å)

The free magnetic layer was composed of a single CoMnSi layer. The lower half of the CoMnSi layer formed the lower free magnetic sublayer and the upper half of the CoMnSi layer formed the upper free magnetic sublayer.

The change in the value ΔR×A was examined when the thickness of a second pinned magnetic sublayer disposed above a free magnetic layer and the thickness of another second pinned magnetic sublayer disposed below the free magnetic layer were different.

Table 2 shows the results.

TABLE 2

In the case where upper and lower second pinned magnetic sublayers have different thicknesses

|  | Lower second pinned magnetic sublayer The left material is adjacent to Ru layer(Å) | Upper second pinned magnetic sublayer The left material is adjacent to Ru layer(Å) | Free magnetic layer(Å) | $\Delta R \times A$ of multilayer film (m$\Omega$μm$^2$) | $\Delta R \times A$ of lower multilayer film (m$\Omega$μm$^2$) | $\Delta R \times A$ of upper multilayer film (m$\Omega$μm$^2$) |
|---|---|---|---|---|---|---|
| Comparative example 4 | CoFe(10)/CoMnGe(40) | CoFe(10)/CoMnGe(40) | CoMnSi(80) | 8.8 | 4.4 | 4.4 |
| Example 5 | CoFe(10)/CoMnGe(40) | CoFe(10)/CoMnGe(50) | CoMnSi(80) | 9.2 | 4.4 | 4.8 |
| Example 6 | CoFe(10)/CoMnGe(40) | CoFe(10)/CoMnGe(30) | CoMnSi(80) | 6.7 | 4.4 | 2.3 |
| Example 7 | CoFe(10)/CoMnGe(40) | CoFe(10)/CoMnGe(20) | CoMnSi(80) | 5.3 | 4.4 | 0.9 |

In the above layered structure, the antiferromagnetic layer composed of PtMn (120 Å), the first pinned magnetic sublayer composed of CoFe (30 Å), the nonmagnetic interlayer composed of Ru (8 Å), the second pinned magnetic sublayer, the nonmagnetic conductive layer composed of Cu (30 Å), and the lower free magnetic sublayer corresponded to the lower multilayer film. The upper free magnetic sublayer, the nonmagnetic conductive layer composed of Cu (30 Å), the second pinned magnetic sublayer, the nonmagnetic interlayer composed of Ru (8 Å), the first pinned magnetic sublayer composed of CoFe (30 Å), and the antiferromagnetic layer composed of PtMn (120 Å) corresponded to the upper multilayer film.

In Examples 6 and 7, the sense current flowed from the bottom to the top of the multilayer film, and therefore, the conduction electrons flowed from the top to the bottom. Accordingly, in Examples 6 and 7, the upper multilayer film corresponded to the upstream part of the multilayer film and the lower multilayer film corresponded to the downstream part of the multilayer film. On the other hand, in Example 5, the sense current flowed from the top to the bottom of the multilayer film, and therefore, the conduction electrons flowed from the bottom to the top. Accordingly, in Example 5, the lower multilayer film corresponded to the upstream part of the multilayer film and the upper multilayer film corresponded to the downstream part of the multilayer film.

According to the results of the Examples, when the thickness of the second pinned magnetic sublayer in the upstream part of the multilayer film was smaller than that of the second pinned magnetic sublayer in the downstream part of the multilayer film, the value $\Delta R \times A$ for the upstream part A of the multilayer film was smaller than the value $\Delta R \times A$ for the downstream part B of the multilayer film.

Example 3

CPP-GMR magnetic sensing elements having the following layer structures were formed, where numerical values in parentheses represent the thickness of each layer.

base layer Ta (30 Å)/seed layer NiFeCr (40 Å)/antiferromagnetic layer PtMn (120 Å)/first pinned magnetic sublayer CoFe (30 Å)/nonmagnetic interlayer Ru (8 Å)/second pinned magnetic sublayer/nonmagnetic conductive layer Cu (30 Å)/free magnetic layer (lower free magnetic sublayer/upper free magnetic sublayer)/nonmagnetic conductive layer Cu (30 Å)/second pinned magnetic sublayer/nonmagnetic interlayer Ru (8 Å)/first pinned magnetic sublayer CoFe (30 ÅA)/antiferromagnetic layer PtMn (120 Å)/protective layer Ta (30 Å)

The change in the value $\Delta R \times A$ was examined when the material of an upper free magnetic sublayer and the material of a lower free magnetic sublayer were different.

Table 3 shows the results.

TABLE 3

In the case where upper free magnetic sublayer and lower free magnetic sublayer may be composed of different materials and the case where all variations are included

|  | Lower second pinned magnetic sublayer The left material is adjacent to Ru layer(Å) | Upper second pinned magnetic sublayer The left material is adjacent to Ru layer(Å) | Free magnetic sublayer The left material forms lower layer(Å) | $\Delta R \times A$ of multilayer film (m$\Omega$μm$^2$) | $\Delta R \times A$ of lower multilayer film (m$\Omega$μm$^2$) | $\Delta R \times A$ of upper multilayer film (m$\Omega$μm$^2$) |
|---|---|---|---|---|---|---|
| Comparative example 1 | CoFe(50) | CoFe(50) | CoFe(10)/NiFe(60)/CoFe(10) | 2.2 | 1.1 | 1.1 |
| Comparative example 5 | CoFe(10)/CoMnGe(40) | CoFe(10)/CoMnGe(40) | CoMnGe(80) | 9.4 | 4.7 | 4.7 |
| Example 8 | CoFe(10)/CoMnGe(40) | CoFe(10)/CoMnGe(40) | CoMnGe(40)/NiFe(30)/CoFe(10) | 6.2 | 4.7 | 1.5 |
| Example 9 | CoFe(10)/CoMnGe(40) | CoFe(10)/CoMnGe(40) | CoMnGe(40)/NiFe(20)/CoFe(10) | 6.4 | 4.7 | 1.7 |
| Example 10 | CoFe(10)/CoMnGe(40) | CoFe(10)/CoMnGe(40) | CoFe(10)/NiFe(30)/CoMnGe(40) | 6.1 | 1.4 | 4.7 |

TABLE 3-continued

In the case where upper free magnetic sublayer and lower free magnetic sublayer may be composed of different materials and the case where all variations are included

|  | Lower second pinned magnetic sublayer The left material is adjacent to Ru layer(Å) | Upper second pinned magnetic sublayer The left material is adjacent to Ru layer(Å) | Free magnetic sublayer The left material forms lower layer(Å) | ΔR × A of multilayer film (mΩμm²) | ΔR × A of lower multilayer film (mΩμm²) | ΔR × A of upper multilayer film (mΩμm²) |
|---|---|---|---|---|---|---|
| Example 11 | CoFe(10)/CoMnGe(40) | CoFe(10)/CoMnGe(40) | CoFe(10)/NiFe(20)/CoMnGe(40) | 6.2 | 1.5 | 4.7 |
| Example 12 | CoFe(10)/CoMnGe(40) | CoFe(10)/CoMnGe(40) | CoMnGe(40)/CoMnSi(40) | 9.0 | 4.7 | 4.3 |
| Example 13 | CoFe(10)/CoMnGe(40) | CoFe(10)/CoMnGe(40) | CoMnSi(40)/CoMnGe(40) | 8.8 | 4.1 | 4.7 |
| Example 14 | CoFe(10)/CoMnGe(50) | CoFe(10)/CoMnSi(40) | CoMnGe(40)/CoMnSi(40) | 8.5 | 4.9 | 3.6 |

In the magnetic sensing elements in Examples 8 to 11, the free magnetic layer had a three-layer structure. In Examples 8 and 9, a CoMnGe sublayer corresponded to the lower free magnetic sublayer and a CoFe sublayer corresponded to the upper free magnetic sublayer. In Examples 10 and 11, a CoFe sublayer corresponded to the lower free magnetic sublayer and a CoMnGe sublayer corresponded to the upper free magnetic sublayer.

In Examples 12 to 14, the free magnetic layer had a two-layer structure. In Examples 12 and 14, a CoMnGe sublayer corresponded to the lower free magnetic sublayer and a CoMnSi sublayer corresponded to the upper free magnetic sublayer. In Example 13, a CoMnSi sublayer corresponded to the lower free magnetic sublayer and a CoMnGe sublayer corresponded to the upper free magnetic sublayer. Furthermore, in Example 14, the upper second pinned magnetic sublayer and the lower second pinned magnetic sublayer were composed of different materials. Thus, the absolute values of the polarizability P and β of the second pinned magnetic sublayer in the upstream part of the multilayer film were controlled to be smaller than those of the second pinned magnetic sublayer in the downstream part of the multilayer film.

In the above layered structure, the antiferromagnetic layer composed of PtMn (120 Å), the first pinned magnetic sublayer composed of CoFe (30 Å), the nonmagnetic interlayer composed of Ru (8 Å), the second pinned magnetic sublayer, the nonmagnetic conductive layer composed of Cu (30 Å), and the lower free magnetic sublayer corresponded to the lower multilayer film. The upper free magnetic sublayer, the nonmagnetic conductive layer composed of Cu (30 Å), the second pinned magnetic sublayer, the nonmagnetic interlayer composed of Ru (8 Å), the first pinned magnetic sublayer composed of CoFe (30 Å), and the antiferromagnetic layer composed of PtMn (120 Å) corresponded to the upper multilayer film.

In Examples 8, 9, 12, and 14, the sense current flowed from the bottom to the top of the multilayer film, and therefore, the conduction electrons flowed from the top to the bottom. Accordingly, in Examples 8, 9, 12, and 14, the upper multilayer film corresponded to the upstream part of the multilayer film and the lower multilayer film corresponded to the downstream part of the multilayer film. On the other hand, in Examples 10, 11 and 13, the sense current flowed from the top to the bottom of the multilayer film, and therefore, the conduction electrons flowed from the bottom to the top. Accordingly, in Examples 10, 11 and 13, the lower multilayer film corresponded to the upstream part of the multilayer film and the upper multilayer film corresponded to the downstream part of the multilayer film.

The materials of the upper free magnetic sublayer and the lower free magnetic sublayer were selected as shown in Table 3. Accordingly, the absolute values of the polarizability P and β of one free magnetic sublayer forming the upstream part of the multilayer film were smaller than those of the polarizability P and β of the other free magnetic sublayer forming the downstream part of the multilayer film.

As a result, the value ΔR×A for the upstream part A of the multilayer film was smaller than the value ΔR×A for the downstream part B of the multilayer film.

Example 4

CPP-GMR magnetic sensing elements having the following layer structures were formed, where the numerical values in parentheses represent the thickness of each layer.

base layer Ta (30 Å)/seed layer NiFeCr (40 Å)/antiferromagnetic layer PtMn (120 Å)/first pinned magnetic sublayer CoFe (30 ÅA)/nonmagnetic interlayer Ru (8 Å)/second pinned magnetic sublayer (CoFe (10 Å)/CoMnGe (40 Å))/nonmagnetic conductive layer Cu/free magnetic layer (CoMnGe (80 Å) (lower free magnetic sublayer (40 Å)/upper free magnetic sublayer (40 Å))/nonmagnetic conductive layer Cu/second pinned magnetic sublayer (CoMnGe (40 Å)/CoFe (10 Å))/nonmagnetic interlayer Ru (8 Å)/first pinned magnetic sublayer CoFe (30 Å)/antiferromagnetic layer PtMn (120 Å)/protective layer Ta (30 Å)

The free magnetic layer was composed of a single CoMnGe layer. The lower half of the CoMnGe layer formed the lower free magnetic sublayer and the upper half of the CoMnGe layer formed the upper free magnetic sublayer.

The change in the value ΔR×A was examined when the thickness of a nonmagnetic conductive layer disposed above a free magnetic layer and the thickness of another nonmagnetic conductive layer disposed below the free magnetic layer were different.

Table 4 shows the results.

TABLE 4

In the case where upper and lower copper spacer layers may have different thicknesses

| | Lower nonmagnetic conductive layer(Å) | Upper nonmagnetic conductive layer(Å) | ΔR × A of multilayer film (mΩμm$^2$) | ΔR × A of lower multilayer film (mΩμm$^2$) | ΔR × A of upper multilayer film (mΩμm$^2$) |
|---|---|---|---|---|---|
| Comparative example 6 | 50 | 50 | 9.2 | 4.6 | 4.6 |
| Example 15 | 50 | 90 | 9.0 | 4.6 | 4.4 |
| Example 16 | 50 | 70 | 9.1 | 4.6 | 4.5 |
| Example 17 | 50 | 30 | 9.3 | 4.6 | 4.7 |

In the above layer structure, the antiferromagnetic layer composed of PtMn (120 Å), the first pinned magnetic sublayer composed of CoFe (30 Å), the nonmagnetic interlayer composed of Ru (8 Å), the second pinned magnetic sublayer (CoFe (10 Å)/CoMnGe (40 Å)), the nonmagnetic conductive layer composed of Cu, and the lower free magnetic sublayer corresponded to the lower multilayer film. The upper free magnetic sublayer, the nonmagnetic conductive layer composed of Cu, the second pinned magnetic sublayer (CoMnGe (40 Å)/CoFe (10 Å)), the nonmagnetic interlayer composed of Ru (8 Å), the first pinned magnetic sublayer composed of CoFe (30 Å), and the antiferromagnetic layer composed of PtMn (120 Å) corresponded to the upper multilayer film.

In Examples 15 and 16, the sense current flowed from the bottom to the top of the multilayer film, and therefore, the conduction electrons flowed from the top to the bottom. Accordingly, in Examples 15 and 16, the upper multilayer film corresponded to the upstream part of the multilayer film and the lower multilayer film corresponded to the downstream part of the multilayer film. On the other hand, in Example 17, the sense current flowed from the top to the bottom of the multilayer film, and therefore, the conduction electrons flowed from the bottom to the top. Accordingly, in Example 17, the lower multilayer film corresponded to the upstream part of the multilayer film and the upper multilayer film corresponded to the downstream part of the multilayer film.

According to the results of the Examples, when the thickness of the nonmagnetic conductive layer in the upstream part of the multilayer film was larger than that of the nonmagnetic conductive layer in the downstream part of the multilayer film, the value ΔR×A for the upstream part A of the multilayer film was smaller than the value ΔR×A for the downstream part B of the multilayer film.

What is claimed is:

1. A magnetic sensing element comprising:
   a multilayer film comprising a lower multilayer film and an upper multilayer film,
   wherein the lower multilayer film comprises a lower free magnetic sublayer, a nonmagnetic conductive layer disposed below the lower free magnetic sublayer, and a pinned magnetic layer disposed below the lower free magnetic sublayer,
   wherein the upper multilayer film comprises an upper free magnetic sublayer, a nonmagnetic conductive layer disposed above the upper free magnetic sublayer, and a pinned magnetic layer disposed above the upper free magnetic sublayer, and
   wherein a value ΔR×A, which represents the variation in magnetoresistance (ΔR)×element area (A), for one of the lower multilayer film and the upper multilayer film is smaller than the value ΔR×A for the other one of the lower multilayer film and the upper multilayer film.

2. The magnetic sensing element according to claim 1, wherein an absolute value of polarizability P of a magnetic material forming one pinned magnetic layer is smaller than an absolute value of polarizability P of a magnetic material forming the other pinned magnetic layer.

3. The magnetic sensing element according to claim 2, wherein each pinned magnetic layer has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein an absolute value of polarizability P of one second pinned magnetic sublayer is smaller than an absolute value of polarizability P of the other second pinned magnetic sublayer.

4. The magnetic sensing element according to claim 1, wherein an absolute value of β of a magnetic material forming one pinned magnetic layer is smaller than an absolute value of β of a magnetic material forming the other pinned magnetic layer, wherein β represents a value that is specific to a magnetic material.

5. The magnetic sensing element according to claim 4, wherein the value satisfies a formula of $\rho\downarrow/\rho\uparrow=(1+\beta)/(1-\beta)$ ($-1\leq\beta\leq1$) (wherein $\rho\downarrow$ represents a specific resistance to minority conduction electrons among conduction electrons, and $\rho\uparrow$ represents a specific resistance to majority conduction electrons among conduction electrons).

6. The magnetic sensing element according to claim 5, wherein each of the pinned magnetic layers has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein an absolute value of β of one second pinned magnetic sublayer is smaller than an absolute value of β of the other second pinned magnetic sublayer.

7. The magnetic sensing element according to claim 1, wherein a thickness of one pinned magnetic layer is smaller than a thickness of the other pinned magnetic layer.

8. The magnetic sensing element according to claim 7, wherein each of the pinned magnetic layers has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein a thickness of one second pinned magnetic sublayer is smaller than a thickness of the other second pinned magnetic sublayer.

9. The magnetic sensing element according to claim 1, wherein the element area (A) of one of the upper multilayer film and the lower multilayer film is larger than the element area (A) of the other one of the upper multilayer film and the lower multilayer film.

10. The magnetic sensing element according to claim 1, wherein a thickness of one nonmagnetic conductive layer is larger than a thickness of the other nonmagnetic conductive layer.

11. The magnetic sensing element according to claim 1, wherein, between the upper free magnetic sublayer and the lower free magnetic sublayer, an absolute value of polarizability P of one free magnetic sublayer is smaller than an absolute value of polarizability P of the other free magnetic sublayer.

12. The magnetic sensing element according to claim 1, wherein, between the upper free magnetic sublayer and the lower free magnetic sublayer, an absolute value of $\beta$ of one free magnetic sublayer is smaller than an absolute value of $\beta$ of the other free magnetic sublayer, wherein $\beta$ represents a value that is specific to a magnetic material.

13. The magnetic sensing element according to claim 12, wherein the value satisfies a formula of $\rho\downarrow/\rho\uparrow=(1+\beta)/(1-\beta)$ $(-1\leq\beta\leq1)$ (wherein $\rho\downarrow$ represents a specific resistance to minority conduction electrons among conduction electrons, and $\rho\uparrow$ represents a specific resistance to majority conduction electrons among conduction electrons).

14. The magnetic sensing element according to claim 1, wherein a thickness of one of the lower free magnetic sublayer and the upper free magnetic sublayer is smaller than a thickness of the other one of the lower free magnetic sublayer and the upper free magnetic sublayer.

15. The magnetic sensing element according to claim 1, wherein an interlayer composed of a magnetic material or a nonmagnetic material is disposed between the upper free magnetic sublayer and the lower free magnetic sublayer.

16. The magnetic sensing element according to claim 1, wherein a free magnetic layer has a synthetic ferrimagnetic structure comprising a first free magnetic sublayer, a second free magnetic sublayer, a third free magnetic sublayer, and nonmagnetic interlayers disposed therebetween,
 wherein the third free magnetic sublayer is the upper free magnetic sublayer and the first free magnetic sublayer is the lower free magnetic sublayer, and
 wherein each of the first free magnetic sublayer and the third free magnetic sublayer is in contact with the corresponding nonmagnetic conductive layer.

17. The magnetic sensing element according to claim 1, wherein a free magnetic layer comprises a single magnetic material, and wherein an upper half of the free magnetic layer is the upper free magnetic sublayer and a lower half of the free magnetic layer is the lower free magnetic sublayer, when the free magnetic layer is bisected in the thickness direction.

18. The magnetic sensing element according to claim 1, wherein a current flows in a direction perpendicular to surfaces of the layers of the multilayer film.

19. A magnetic sensing element comprising:
 a multilayer film comprising a free magnetic layer, a nonmagnetic conductive layer disposed below the free magnetic layer, a pinned magnetic layer disposed below the free magnetic layer, a nonmagnetic conductive layer disposed above the free magnetic layer, and a pinned magnetic layer disposed above the free magnetic layer,
 wherein a current flows in a direction perpendicular to surfaces of the layers of the multilayer film,
 wherein the free magnetic layer has laminated structure comprising an upper free magnetic sublayer and a lower free magnetic sublayer
 wherein the lower free magnetic sublayer, the nonmagnetic conductive layer disposed below the lower free magnetic sublayer, and the pinned magnetic layer disposed below the lower free magnetic sublayer form a lower multilayer film, and the upper free magnetic sublayer, the nonmagnetic conductive layer disposed above the upper free magnetic sublayer, and the pinned magnetic layer disposed above the upper free magnetic sublayer form an upper multilayer film; and between the lower multilayer film and the upper multilayer film, one multilayer film disposed upstream of a current of conduction electrons is defined as an upstream part of the multilayer film and the other multilayer film disposed downstream of a current of conduction electrons is defined as a downstream part of the multilayer film, and
 wherein a value $\Delta R\times A$, which represents the variation in magnetoresistance×element area (A), for the upstream part of the multilayer film is smaller than the value $\Delta R\times A$ for the downstream part of the multilayer film.

20. The magnetic sensing element according to claim 19, wherein an absolute value of polarizability P of a magnetic material forming one pinned magnetic layer disposed in the upstream part of the multilayer film is smaller than an absolute value of polarizability P of a magnetic material forming the other pinned magnetic layer disposed in the downstream part of the multilayer film.

21. The magnetic sensing element according to claim 20, wherein each of the pinned magnetic layers has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein an absolute value of polarizability P of one second pinned magnetic sublayer disposed in the upstream part of the multilayer film is smaller than an absolute value of polarizability P of the other second pinned magnetic sublayer disposed in the downstream part of the multilayer film.

22. The magnetic sensing element according to claim 19, wherein an absolute value of $\beta$ of a magnetic material forming one pinned magnetic layer disposed in the upstream part of the multilayer film is smaller than an absolute value of $\beta$ of a magnetic material forming the other pinned magnetic layer disposed in the downstream part of the multilayer film,
 wherein $\beta$ represents a value that is specific to a magnetic material, the value satisfying a formula of $\rho\downarrow/\rho\uparrow=(1+\beta)/(1-\beta)$ $(-1\leq\beta\leq1)$ (wherein $\rho\downarrow$ represents a specific resistance to minority conduction electrons among the conduction electrons, and $\rho\uparrow$ represents a specific resistance to majority conduction electrons among the conduction electrons).

23. The magnetic sensing element according to claim 22, wherein each of the pinned magnetic layers has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein an absolute value of $\beta$ of one second pinned magnetic sublayer disposed in the upstream part of the multilayer film is smaller than an absolute value of β of the other second pinned magnetic sublayer disposed in the downstream part of the multilayer film.

24. The magnetic sensing element according to claim 19, wherein a thickness of one pinned magnetic layer disposed in the upstream part of the multilayer film is smaller than a thickness of the other pinned magnetic layer disposed in the downstream part of the multilayer film.

25. The magnetic sensing element according to claim 24, wherein each of the pinned magnetic layers has a synthetic ferrimagnetic structure comprising a first pinned magnetic sublayer, a second pinned magnetic sublayer, and a nonmagnetic interlayer disposed therebetween, wherein each second pinned magnetic sublayer is in contact with the corresponding nonmagnetic conductive layer, and wherein a thickness of one second pinned magnetic sublayer disposed in the upstream part of the multilayer film is smaller than a thickness of the other second pinned magnetic sublayer disposed in the downstream part of the multilayer film.

26. The magnetic sensing element according to claim 19, wherein an element area (A) in the upstream part of the multilayer film is larger than an element area (A) in the downstream part of the multilayer film.

27. The magnetic sensing element according to claim 19, wherein a thickness of one nonmagnetic conductive layer disposed in the upstream part of the multilayer film is larger than a thickness of the other nonmagnetic conductive layer disposed in the downstream part of the multilayer film.

28. The magnetic sensing element according to claim 19, wherein, between the upper free magnetic sublayer and the lower free magnetic sublayer, an absolute value of polarizability P of one free magnetic sublayer forming the upstream part of the multilayer film is smaller than an absolute value of polarizability P of the other free magnetic sublayer forming the downstream part of the multilayer film.

29. The magnetic sensing element according to claim 19, wherein, between the upper free magnetic sublayer and the lower free magnetic sublayer, an absolute value of β of one free magnetic sublayer forming the upstream part of the multilayer film is smaller than an absolute value of β of the other free magnetic sublayer forming the downstream part of the multilayer film, wherein β represents a value that is specific to a magnetic material, the value satisfying a formula of $\rho\downarrow/\rho\uparrow = (1+\beta)/(1-\beta)$ $(-1 \leq \beta \leq 1)$ (wherein $\rho\downarrow$ represents a specific resistance to minority conduction electrons among the conduction electrons, and $\rho\uparrow$ represents a specific resistance to majority conduction electrons among the conduction electrons).

30. The magnetic sensing element according to claim 19, wherein, between the upper free magnetic sublayer and the lower free magnetic sublayer, a thickness of one free magnetic sublayer forming the upstream part of the multilayer film is smaller than a thickness of the other free magnetic sublayer forming the downstream part of the multilayer film.

31. The magnetic sensing element according to claim 19, wherein the free magnetic layer comprises an interlayer composed of a magnetic material or a nonmagnetic material disposed between the upper free magnetic sublayer and the lower free magnetic sublayer.

32. The magnetic sensing element according to claim 19, wherein the free magnetic layer has a synthetic ferrimagnetic structure comprising a first free magnetic sublayer, a second free magnetic sublayer, a third free magnetic sublayer, and nonmagnetic interlayers disposed therebetween, wherein each of the first free magnetic sublayer and the third free magnetic sublayer is in contact with the corresponding nonmagnetic conductive layer, and wherein the third free magnetic sublayer is the upper free magnetic sublayer and the first free magnetic sublayer is the lower free magnetic sublayer.

33. The magnetic sensing element according to claim 19, wherein the free magnetic layer comprises a single magnetic material, and wherein an upper half of the free magnetic layer is the upper free magnetic sublayer and a lower half of the free magnetic layer is the lower free magnetic sublayer, when the free magnetic layer is bisected in the thickness direction.

* * * * *